United States Patent
Baird et al.

(10) Patent No.: US 9,014,058 B2
(45) Date of Patent: Apr. 21, 2015

(54) ENHANCEMENT OF AUDIO CONFERENCE PRODUCTIVITY THROUGH GAIN BIASING

(75) Inventors: Randall B. Baird, Austin, TX (US); Thiya Ramalingam, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 878 days.

(21) Appl. No.: 12/823,441

(22) Filed: Jun. 25, 2010

(65) Prior Publication Data

US 2011/0317825 A1    Dec. 29, 2011

(51) Int. Cl.
| | |
|---|---|
| *H04L 12/16* | (2006.01) |
| *H04Q 11/00* | (2006.01) |
| *H04M 3/40* | (2006.01) |
| *H04M 3/56* | (2006.01) |

(52) U.S. Cl.
CPC ............... *H04M 3/40* (2013.01); *H04M 3/568* (2013.01)

(58) Field of Classification Search
CPC ......... H03M 3/568; H03M 3/40; H03M 3/56; H03M 7/006; H04L 12/1822
See application file for complete search history.

(56) References Cited

U.S. PATENT DOCUMENTS

| | | | | |
|---|---|---|---|---|
| 7,907,599 | B2 * | 3/2011 | Hardie et al. | 370/352 |
| 8,064,390 | B2 * | 11/2011 | Cai et al. | 370/329 |
| 2007/0047515 | A1 * | 3/2007 | Jonsson et al. | 370/352 |
| 2007/0086365 | A1 * | 4/2007 | Chen et al. | 370/260 |
| 2008/0037749 | A1 * | 2/2008 | Metzger et al. | 379/202.01 |

\* cited by examiner

*Primary Examiner* — Ian N Moore
*Assistant Examiner* — Eric H Wang
(74) *Attorney, Agent, or Firm* — Edell, Shapiro & Finnan, LLC

(57) ABSTRACT

Techniques are provided for communicating with a plurality of endpoints participating in a conference session. A signal representing audio from each of the endpoints is received at a control unit. The control unit adjusts one or more target power levels for purposes of automatic gain control of the audio from one or more of the endpoints based on information derived in real-time from the audio of the plurality of endpoints during the conference session and predetermined information pertaining to a source of the audio from at least one of the endpoints.

25 Claims, 15 Drawing Sheets

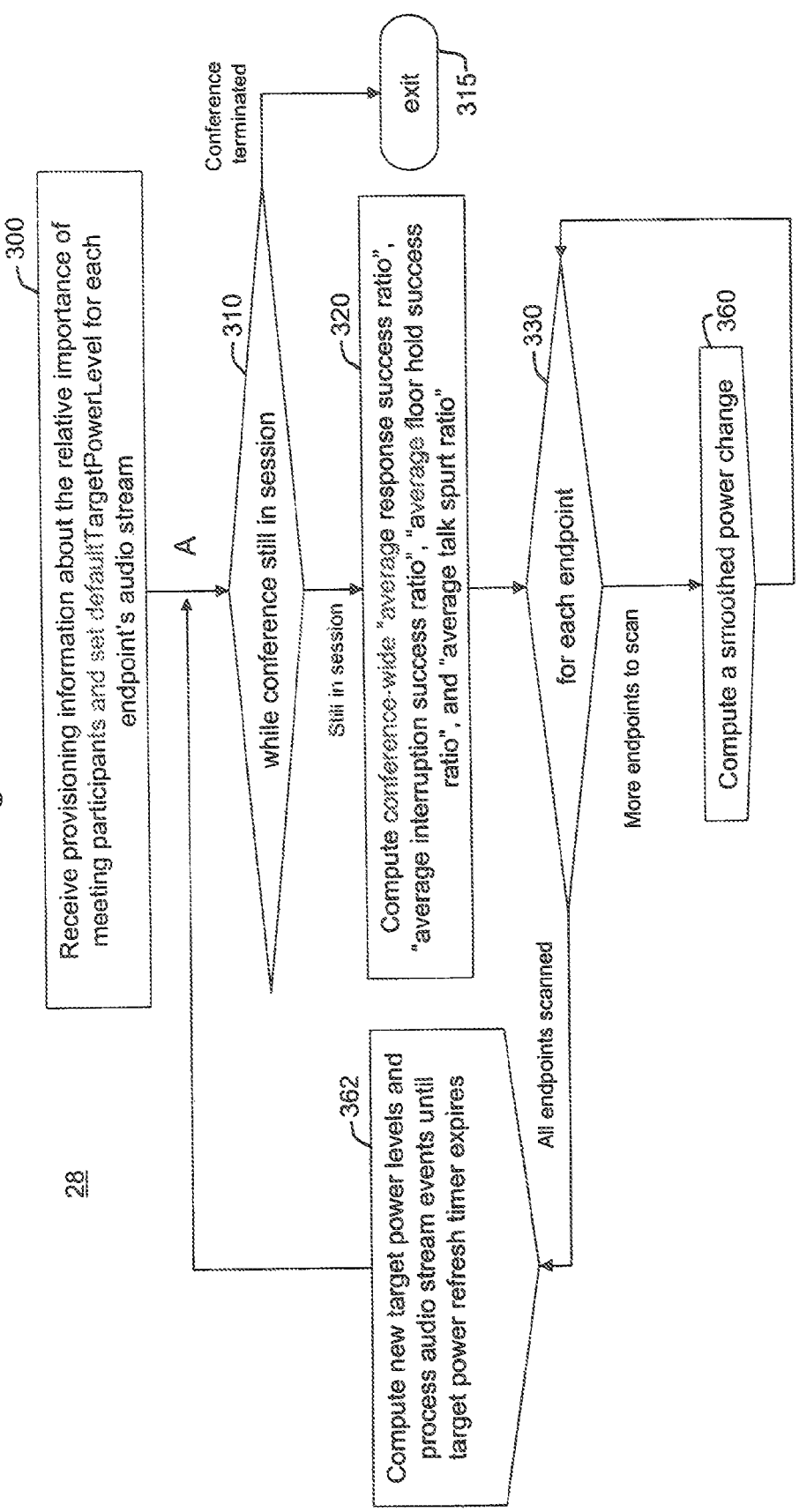

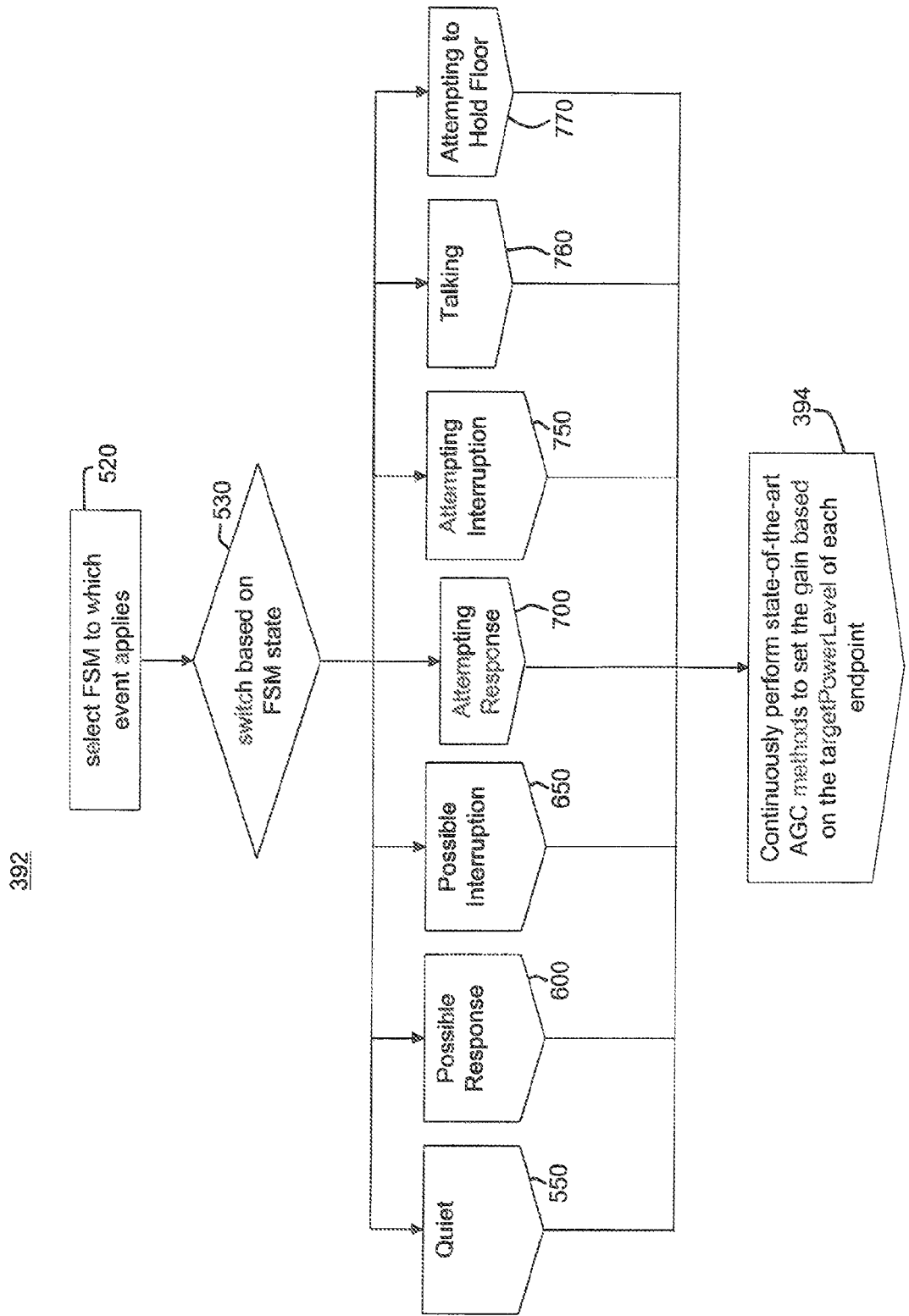

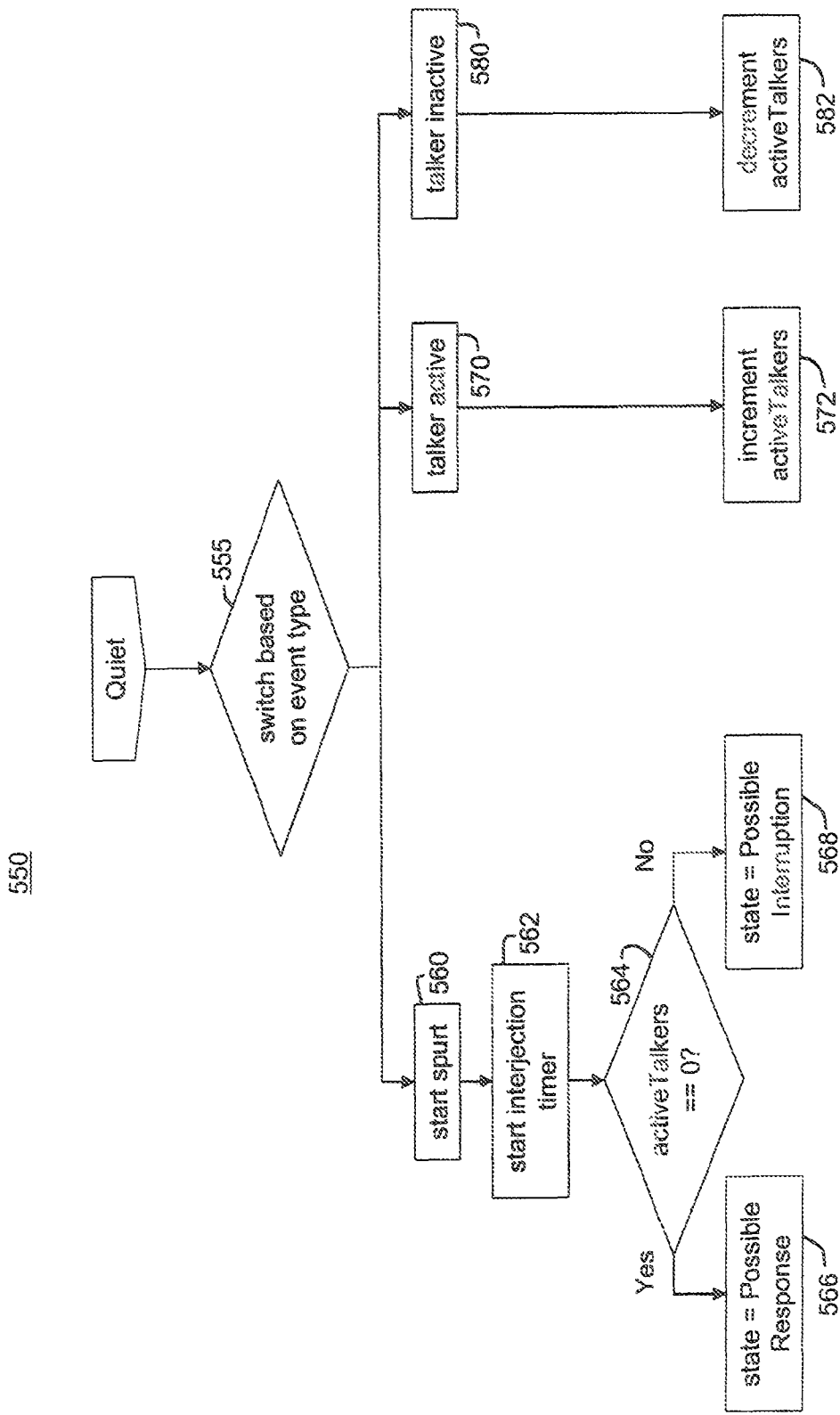

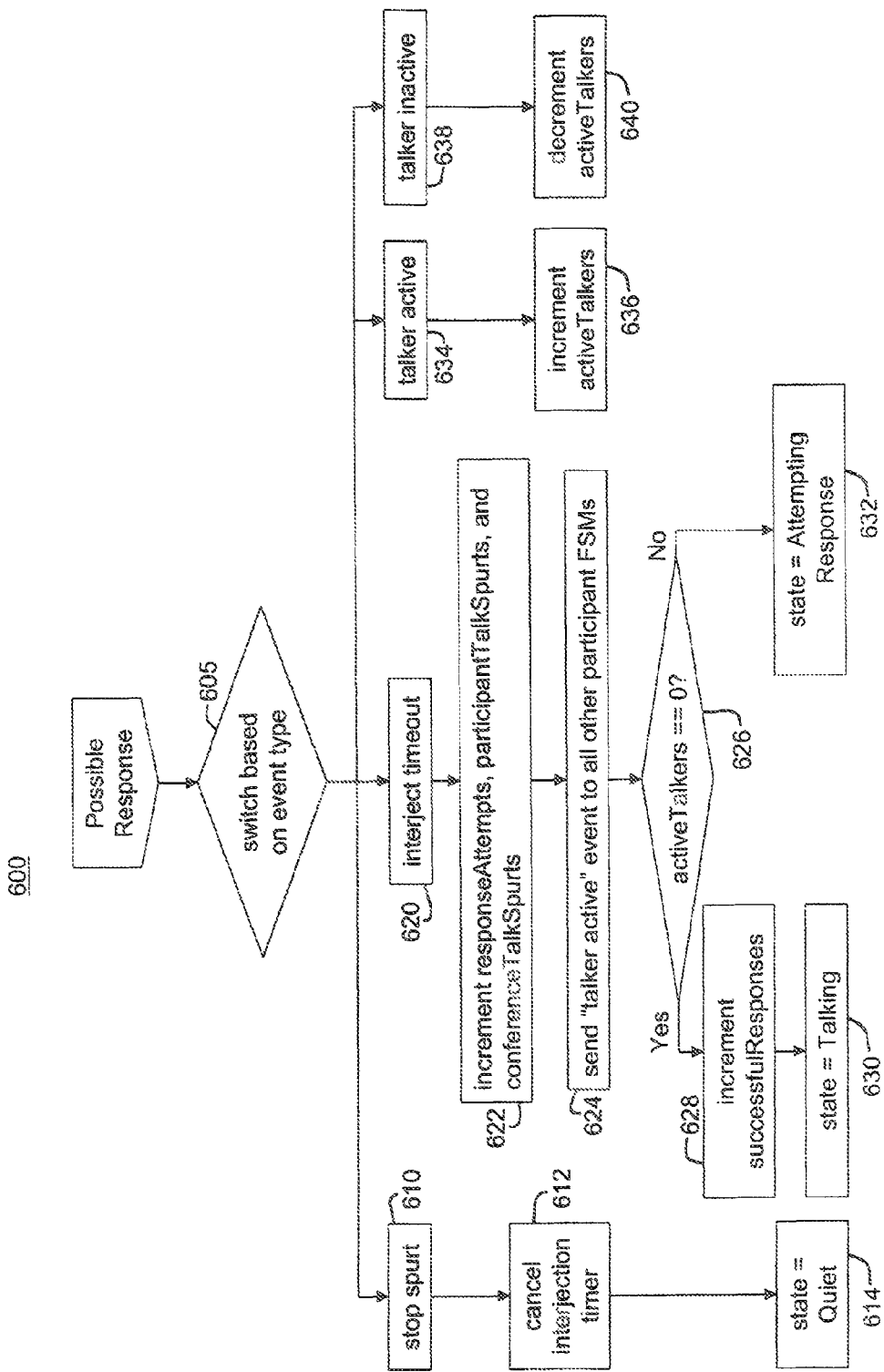

ENHANCEMENT OF AUDIO CONFERENCE PRODUCTIVITY THROUGH GAIN BIASING

TECHNICAL FIELD

The present disclosure relates to audio conference networks and techniques for processing audio in connection with a conference session.

BACKGROUND

Automatic gain control devices techniques involve adjusting the output audio power of an audio stream based on the deviation of the audio power from some target value. For example, if the audio power of an audio stream is below a target value, gain is increased, and if the audio power of an audio stream is above a target value, the gain is decreased. In a conference session, the target value may be based on an average power of all participants of an audio session in an attempt to make all participants "equal" in terms of the audio power of each participant. Current automatic gain control techniques consider each voice stream independently and do not adjust the target power of audio streams based on their interactions with one another.

However, even when all gains are roughly equal, acoustic or psychological effects can cause some participants to dominate an audio conference, while other participants are placed at a disadvantage. Participants with loud voices, low-gain earpieces or loudspeakers, poor hearing, or even intense concentration on what they are saying, can miss normal auditory cues that would allow their speech to be interrupted. Similarly, participants with soft voices, high-gain earpieces or loudspeakers, or who are unusually sensitive to interruptions, can be preempted from speaking. Because the audio conference bridge will only mix a small number of simultaneous speakers, typically 2 or 3, which are selected based on those speakers which have the most voice energy at the conference bridge, additional effects may occur. For example, when quiet participants are mixed simultaneously, they often will talk over each other, since the ambient acoustic sound of each participant's voice is much louder than the mixed sound of the other low-gain voices that are returned over the audio channel. The result is that no speaker obtains a good audio cue that there has been a collision. In contrast, when a quiet speaker and a louder speaker speak simultaneously, the louder speaker's voice is more likely to register with the quiet speaker's ear.

In many audio and video conference meetings, some participants' inputs are more necessary than others. A way of biasing the gain applied at a conference bridge so that certain participants are more likely to be heard can greatly improve meeting productivity.

BRIEF DESCRIPTION OF THE DRAWINGS

FIG. 5 is an example of a flow chart depicting operations of gain control policy agent process logic executed in the multipoint control unit for controlling the gain of audio at each conference endpoint.

FIG. 7 is an example of a flow chart depicting a process for determining a state of the FSM for each conference endpoint.

FIG. 8 is an example of a flow chart depicting a process for determining transitions from a Quiet state of the FSM.

FIG. 9 is an example of a flow chart depicting a process for determining transitions from a Possible Response state of the FSM.

DETAILED DESCRIPTION OF THE DRAWINGS

Overview

Techniques are provided for communicating with a plurality of endpoints participating in a conference session, receiving a signal representing audio from each of the endpoints and adjusting a target power level of the audio from one or more of the endpoints based on information derived in real-time from the audio of the plurality of endpoints during the conference session and predetermined information pertaining to a source of the audio from at least one of the endpoints.

EXAMPLE EMBODIMENTS

Figure 1:
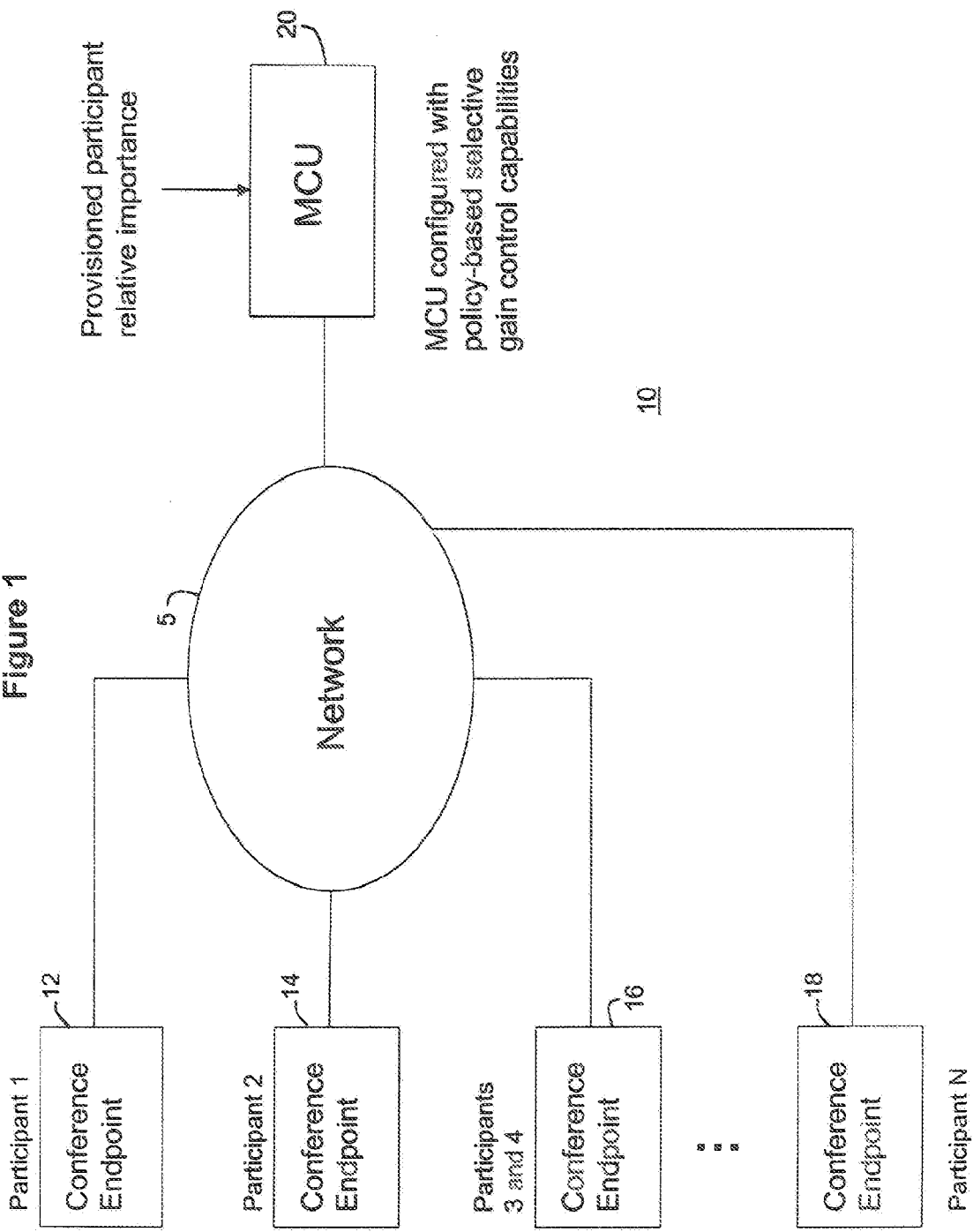
FIG. 1 is an example of an audio conference system comprising a plurality of conference endpoints and a multipoint control unit configured to perform selective audio gain control techniques on audio from the conference endpoints.

Referring first to FIG. 1, an audio conference system is shown at reference numeral 10. The system 10 comprises a plurality of conference endpoints, shown at reference numerals 12, 14, 16, and 18, and a multipoint control unit, shown at reference numeral 20. The conference endpoints 12-18 communicate with the multipoint control unit 20 over a data network 5, e.g., the Internet. The conference endpoints 12, 14, 16, and 18 are configured to transmit audio data from a plurality of participants across the system 10 to the multipoint control unit 20 and to receive audio data from other conference endpoints mixed by the multipoint control unit 20. At one or more of the plurality of conference endpoints there may be multiple participants in a conference session. FIG. 1 shows that there is one participant, Participant 1, at endpoint 12; one participant, Participant 2, at endpoint 14; two participants, Participants 3 and 4, at endpoint 16 and one participant, Participant N, at endpoint 18. The participants at the endpoints can be persons that are participating in the conference while the endpoint may be an audio stream source configured to transmit the audio data. This only an example.

The system 10 may be any network capable of transmitting and processing a plurality of audio data originating from a plurality of conference endpoints. For example, Cisco WebEx™ and Cisco MeetingPlace™ audio conference technologies may be used. In addition, the system 10 may support video conferencing whereby each endpoint 12-18 is configured to capture video (as well as audio) and transmit a video stream to the multipoint control unit 20 which in turn switches the video streams for transmission back to each endpoint so that one endpoint receives the video streams from the other endpoints participating in a conference session. The audio gain adjustment techniques described herein are applicable to an audio-only conference as well as a video (with audio) conference.

The multipoint control unit 20 is configured with policy-based gain control and power level management capabilities to automatically adjust the gain of audio from one or more conference endpoints so that the power of the audio stream is close to a target power level. The multipoint control unit 20 may determine the target power level using techniques described hereinafter based on statistics associated with audio from a conference endpoint and also based on provisioned participant relative importance information, i.e., one or more persons participating in a conference session has more importance (based on position within a business, expertise on a topic, etc.) and should therefore have a higher target audio power level than the other participants.

Figure 2:
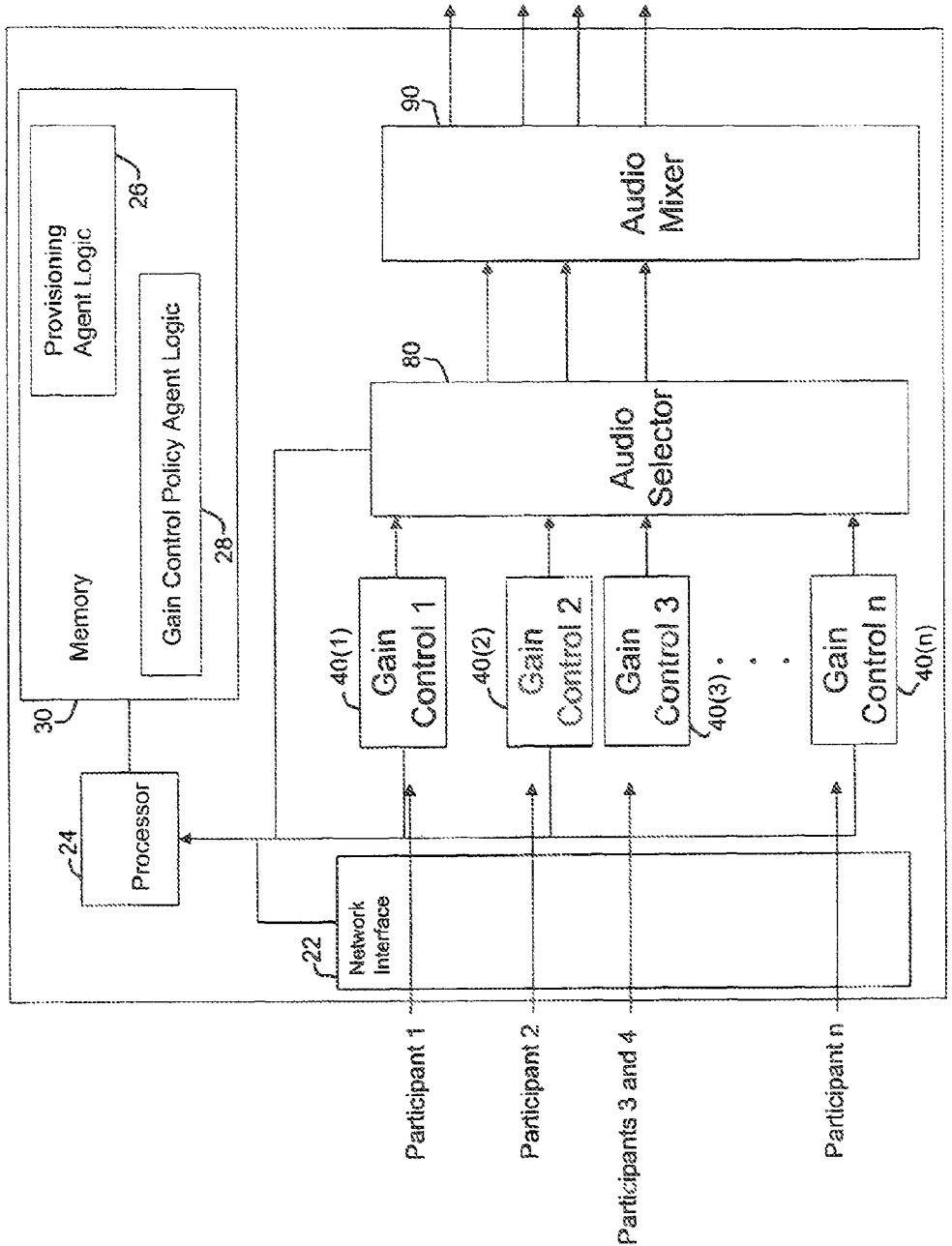
FIG. 2 is an example of a block diagram showing the multipoint control unit configured to perform the selective audio gain control techniques.

Turning to FIG. 2, a block diagram of the multipoint control unit 20 is now described. The multipoint control unit (herein "MCU") 20 comprises a network interface 22, a processor 24 and a memory 30. The memory 30 is, for example, random access memory (RAM) but may also comprise electrically erasable programmable read only memory (EEPROM), particularly for storage of software information. The network interface 22 is configured to receive a signal representing the audio data from each of the plurality of conference endpoints 12, 14, 16, and 18, across the network 10 and to transmit a mixed audio data stream back to the conference endpoints 12-18 after gain adjustments are made as described hereinafter. The processor 24 is configured to execute instructions stored in memory 30 for carrying out the various techniques described herein. In particular, the processor 24 is configured to execute program logic instructions (i.e., software) stored in memory 30 for a provisioning agent process logic 26 and gain control policy agent process logic 28. Generally, the provisioning agent process logic 26 is configured to receive provisioning information related to the relative importance of a person participating in a conference session. The gain control policy agent process logic 28 is configured to cause the processor 24 to adjust a target power level for the audio from one or more conference endpoints based on information obtained by the provisioning agent process logic 26 and also based on audio statistics obtained in real-time during an ongoing conference session.

The operations of processor 24 may be implemented by logic encoded in one or more tangible media (e.g., embedded logic such as an application specific integrated circuit, digital signal processor instructions, software that is executed by a processor, etc), wherein memory 30 stores data used for the operations described herein and stores software or processor executable instructions that are executed to carry out the operations described herein. The provisioning agent process logic 26 and gain control policy agent process logic 28 may take any of a variety of forms, so as to be encoded in one or more tangible media for execution, such as fixed logic or programmable logic (e.g., software/computer instructions executed by a processor) and the processor 24 may be an application specific integrated circuit (ASIC) that comprises fixed digital logic, or a combination thereof. For example, the processor 24 may be embodied by digital logic gates in a fixed or programmable digital logic integrated circuit, which digital logic gates are configured to perform the operations for the provisioning agent process logic 26 and gain control policy agent logic 28. In one form, the provisioning agent process logic 26 and gain control policy agent process logic 28 may be embodied in a processor or computer-readable memory medium (memory 30) that is encoded with instructions for execution by a processor (e.g. a processor 24) that, when executed by the processor, are operable to cause the processor to perform the operations described herein in connection with the provisioning agent process logic 26 and gain control policy agent process logic 28.

There are other components shown in FIG. 2 that provide additional supporting roles for the overall operation of the MCU device 20. There is a plurality of gain control devices, shown in reference numerals 40(1)-40(n), which are configured to receive gain control instructions or commands generated by the processor 24 when executing the gain control policy agent logic 28. The processor causes the gain control devices to adjust a power level of the audio from one or more of the endpoints based on information derived in real-time from the audio of the plurality of endpoints during the conference session and predetermined information (for example, a relative importance of the sources of audio at the plurality of endpoints during the conference) pertaining to a source of the audio from at least one of the endpoints. Each gain control devices 40(1)-40(n) is configured to receive a corresponding one of the plurality of audio data streams from the conference endpoints and to apply an audio power gain based on a corresponding gain control instructions or command received generated by the processor 24 upon execution of the gain control policy agent logic 28. The output of each gain control device 40(1)-40(n) is a gain-adjusted audio data stream where at some instances no gain adjustment is made to an audio data stream and at other instances gain adjustment is applied to an audio data stream.

An audio selector device 80 is coupled to the gain control policy agent logic 28 and to the audio mixer device 90. The audio selector device 80 is configured to receive the plurality of audio data streams from the plurality of gain control devices 40(1)-40(n), and to select appropriate ones of the gain adjusted audio data streams for supply to an audio mixer device 90. The audio selector device 80 is also coupled to the processor 24 to supply participant talker information (as described further hereinafter) for use by the processor 24 in executing the gain control policy agent logic 28. The audio mixer 90 is configured to receive selected ones of the plurality of gain-adjusted audio data streams, for example the currently loudest two or three data streams (from two or three participants at respective endpoints), from the audio selector 80 and to mix them appropriately for transmission to the conference endpoints that are participating in a conference session. The techniques described herein involve specifying in a dynamic manner, and also based on the relative importance of the participants, the target power levels for the automatic gain control modules 40(1)-40(n). Thus, the adjustments for an audio stream that are computed according to these techniques are adjustments made to the target power level of the audio from one or more endpoints based on information derived in real-time from the audio of the plurality of endpoints during the conference session and predetermined information pertaining to a source of the audio (relative importance of a participant) from at least one of the endpoints.

Figure 3:
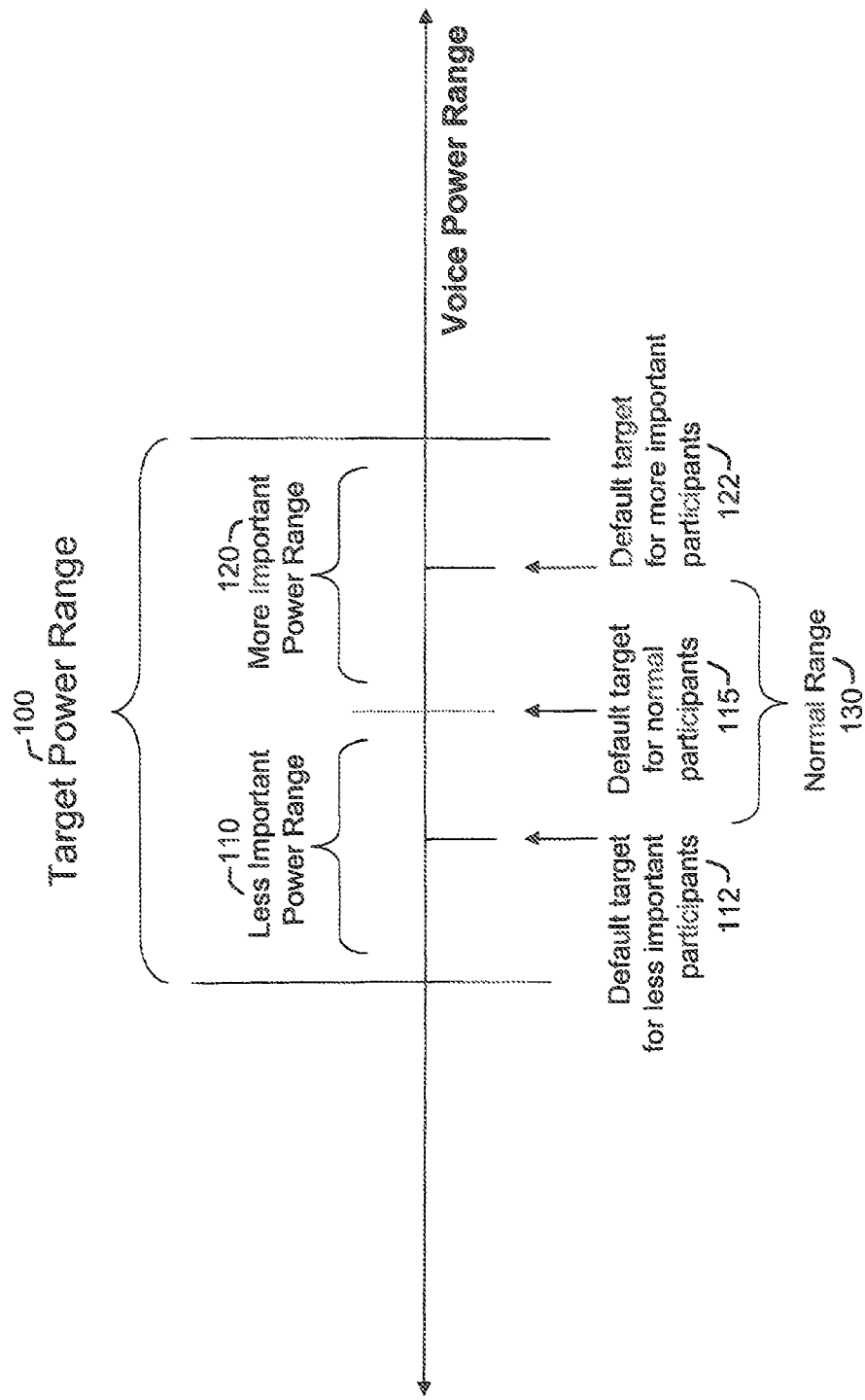
FIG. 3 is an example of a diagram illustrating a specified target power range within a voice power range.

Turning to FIG. 3, an example of a specified target power range 100 of a voice power range is shown. The target power range 100 is the range of audio power that is desired for each of the plurality of audio data streams from the plurality of conference endpoints. The MCU 20 adjusts the audio power gain for each of the plurality of audio data streams such that the power level for the audio from each of the plurality of endpoints is maintained within the target power range 100. Within the target power range 100, there are three sub-ranges: a less important power range 110, a more important power range 120, and normal range 130. The less important power range 110 is at a range that is less than the more important power range 120. The less important power range 110 is a power range dedicated for conference participants that are deemed to be relatively lower in importance than other participants involved in the same conference session. The normal power range 130 is dedicated to participants that are neither deemed less important or more important for a given conference session. There is a default target value 112 within the less important power range 110 for less important participants. Similarly, there is a default target value 122 within the more important power range 120 for more important participants. There is also default target 115 in the normal power range 130. Thus, the MCU 20 stores data defining a different predetermined range for power level for audio from a participant at an endpoint based on the relative importance of that participant.

The processor 24 in the MCU 20 receives provisioning information indicating the relative importance of each of the participants at the conference endpoints. Using this provisioning information, the processor 24 in the MCU adjusts the gain for the respective audio data streams received from the conference endpoints so that the gain-adjusted audio data stream has a power level that falls within the appropriate sub-range (and close to a target power level in the respective sub-range) of the target power range 100 according to the relative importance of the respective participant.

In a situation where there are multiple participants at a conference endpoint, such as at conference endpoint 16 shown in FIG. 1, the MCU 20 may be configured to use the higher importance participant of the multiple participants at an endpoint as being determinative of the gain applied to the audio data from that conference endpoint. In this way, the higher importance participant will still have his/her audio given suitable gain emphasis even if there are less important participants sharing that conference endpoint.

In a conference session where there are multiple participants at multiple endpoints, MCU 20 may adjust the gain for quiet participants (i.e. "low-power participants"). For example, in a conference session where there are multiple participants at multiple endpoints, low-power participants often may not be heard when they speak at a time simultaneous with loud participants (i.e. "high-power participants"). This usually occurs when a previous participant has just finished speaking, and several other participants attempt to respond simultaneously. In a contentious audio conference meeting, a low-power participant may not be able to express his/her viewpoints in a timely fashion. Some participants may need a higher power level than others to be heard "fairly". As a result, the MCU 20 may need to increase the gain for the low power participants in order for the remaining participants in the conference session to hear them speak. In another example, high power participants who are talking excessively may not be able to hear low power participants who might need to interrupt them, and the MCU 20 may need either to increase the gain for these low power participants so that they are heard or to decrease the gain of the high power participants. This may occur due to the hearing acuity of the participant or the general behavior of the participant in that some people making complicated arguments/statements focus on what they are trying to say to the exclusion of listening for auditory cues that might otherwise improve meeting efficiency.

As mentioned above, the MCU adjusts the audio power gain for each of the plurality of audio data streams such that the power level for the audio from each of the plurality of endpoints is maintained close to a predetermined "target power level". The target power level or value is the power level at which an audio data stream for an endpoint should be after gain control is applied to the audio stream. Instead of a single target power level value for all participants in a conference, each participant, that is, each of the plurality of audio data streams, has a separate target power value or level determined by the gain control policy agent logic 28. The gain control policy agent logic 28 may periodically determine the target power values for the audio data streams by calculating and analyzing audio statistics of the plurality of audio streams, gathered over the duration of the conference. Examples of audio statistics that may be measured by the processor 24 include audio activity related to "talk spurts", "interjections", "responses", "interruptions", and "floor holds". It should be understood, though, that other audio statistics may also be used.

A "talk spurt" is defined as an audio statement by a participant received by the MCU 20 in one of the audio streams. A talk spurt may be classified as an interjection, a response or an interruption.

An "interjection" is a very short talk spurt generally provided by a participant in an audio data stream as a social prompt. For example, a talk spurt is an interjection if the duration of a talk spurt is below a certain interjection threshold duration (for example, one second). The processor 24 of the MCU 20 may execute an interjection timer according to the interjection threshold to classify a talk spurt as an interjection. Examples of interjection talk spurts may be certain social responses, for example, the expression "uh huh," "yes," "wow," "really," "cool," etc. The MCU 20 is configured to monitor the signals from the plurality of endpoints to discern between time intervals of voice audio that are relatively short interjections from time intervals of voice audio that are relatively long talk spurts.

If the duration of a talk spurt is greater than the interjection threshold, then the talk spurt may be classified as either a "response attempt" or an "interruption attempt". An example of a response attempt may be an attempt by a participant in an audio stream to start speaking after a previous speaker has stopped speaking. Another example of a response attempt may be the beginning of a talk spurt from one endpoint, very near the end of a talk spurt from one or more other endpoints. This definition can cover a conversational mode where two participants are sufficiently in sync with one another such that their conversation represents a continuous flow of talking, rather than one participant talking, a moment of silence, the other participant talking, another moment of silence, and so on. Several participants may make response attempts simultaneously, though typically only one participant will succeed when multiple simultaneous responses are attempted. An "interruption attempt" is an attempt by a participant to speak while a previous speaker is still speaking. An "external interruption attempt" is an attempt by another participant to talk while a participant is talking. That is, the external interruption attempt is viewed from the perspective of the participant currently speaking while the interruption attempt is viewed from the perspective of the participant attempting to interrupt.

The processor 24 generates data tracking detections of talk spurts for each participant, categorized by one or more of the definitions above. In addition, the processor 24 generates additional data tracking detections based on the ultimate outcome of a talk spurt: A "successful response" is detected when a talk spurt previously categorized as a response attempt ends with no other participants talking. A "successful interruption" is detected when a talk spurt previously categorized as an interruption attempt ends with no other participants talking. A "floor hold" occurs when a participant currently speaking continues to speak despite external interruption attempts by other participants, that is, the participants attempting to interrupt stop talking before the participant being interrupted. Based on these talk spurt detections over time for each endpoint, the processor 24 generates audio statistics.

The processor 24 may derive a set of ratios or metrics based on the audio statistics of each endpoint's audio stream to determine the target power values for the audio data streams. Examples of these ratios or metrics include, but are not limited to, a "response success ratio", an "interruption success ratio", a "floor hold success ratio", and a "talk spurt ratio". A response success ratio is the ratio of the number of successful responses to the number of response attempts at an endpoint. An interruption success ratio is the ratio of the number of successful interruptions to the number of interruption attempts at an endpoint. A floor hold success ratio is the ratio of successful floor holds to the number of external interruption attempts. A talk spurt ratio is the ratio of non-interjection talk spurts at an endpoint to the total number of talk spurts for all of the endpoints in the conference session.

The processor 24 may periodically adjust the target power level for each of the audio data streams of a conference session based on these ratios and the provisioned relative importance information obtained by the provisioning agent logic 26.

Figure 4:
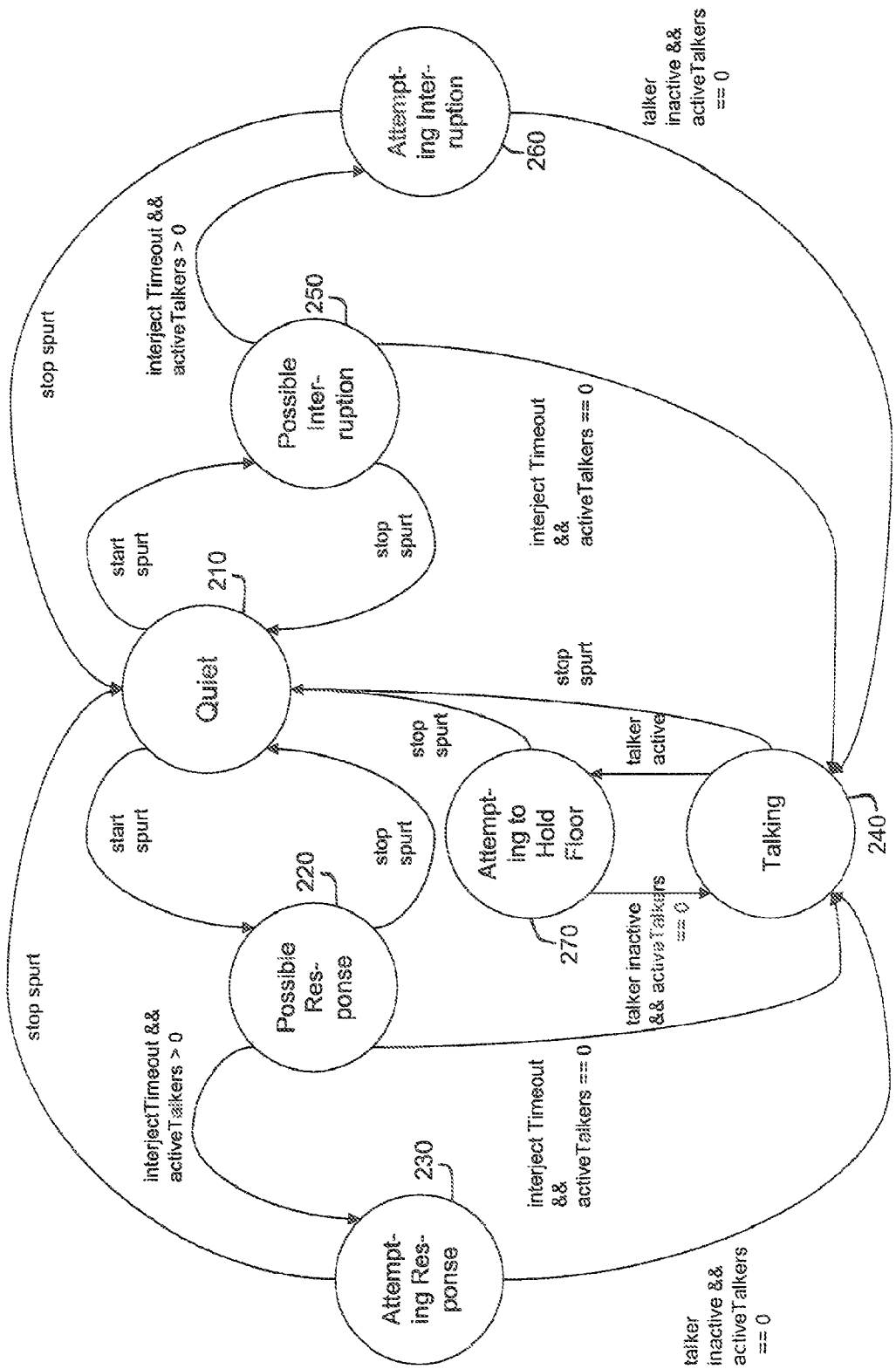
FIG. 4 is an example of a diagram depicting a finite state machine (FSM) configured to track audio from a conference endpoint.

Turning now to FIG. 4, an example of a state diagram 200 for a finite state machine (hereinafter "FSM") is shown, where the FSM is configured to gather audio statistics for each conference endpoint and to transition between states depending on a set of events derived from changes in the properties of each audio stream. FIGS. 8-14, described hereinafter, further explain the conditions that cause transitions between states of the FSM and also the actions that occur as a result of a state transition. Thus, there is an FSM running for each conference endpoint. There are several states for the FSM in the state diagram 200. The states are: a Quiet state 210, a Possible Response state 220, an Attempting Response state 230, a Talking state 240, a Possible Interruption state 250, an Attempting Interruption state 260, and an Attempting-to-Hold Floor state 270. The transitions between states of the FSM for each conference endpoint are determined based on information derived in real-time from the audio from each of the plurality of conference endpoints, as described in further detail below.

The FSM 200 uses certain properties of the audio stream to transition between states. For example, the FSM detects the occurrence of certain events to transition between states. Examples of events are "start spurt," "stop spurt," "interject timeout," "talker active," and "talker inactive" event.

A "start spurt" event occurs when a participant at the endpoint begins a talk spurt, and a "stop spurt" event occurs when a participant at the endpoint ends a talk spurt. An "interject timeout" event occurs when an interjection timer expires, thus indicating that the talk spurt is a genuine attempt to speak rather than being an interjection. When a non-interjection talk spurt is detected for an endpoint, it sends a "talker active" event to the FSMs of all other endpoints in the conference. When the end of a non-interjection talk spurt is detected for an endpoint, it sends a "talker inactive" event to the FSMs of all other endpoints in the conference. For example, in FIG. 4, if the FSM 200 is in the Quiet state 210, a "start spurt" event would cause the FSM 200 to transition to either the Possible Response state 220 or the Possible Interruption state 250. Similarly, if the FSM 200 is in the Talking state 240, a "talker active" event would cause the FSM 200 to transition to the Attempting-to-Hold-Floor state 270. These state transitions and the behavior associated with the transitions are described in further detail hereinafter in connection with FIGS. 8-14.

The processor 24 uses certain variables specific to that endpoint to record statistics and determine state transitions of the FSM for that endpoint. Examples of these variables are include: "activeTalkers," "responseAttempts," "successfulResponses," "interruptionAttempts," "successfulInterruptions," "externalInterruptionAttempts," "successfulFloorHolds," "participantTalkSpurts," "defaultTargetPowerLevel," "targetPowerLevel," and "powerChangeHistory." These variables are defined as follows.

The "activeTalkers" variable represents a value for the current count of active talkers that are not at this endpoint. In other words, the "activeTalkers" is a value indicating count of active talkers associated with all other endpoints. The "responseAttempts" variable represents a value for the number of response attempts made at the endpoint. The "successfulResponses" variable represents a value for the number of successful responses at the endpoint. The "interruptionAttempts" variable represents a value for the number of interruption attempts at the endpoint. The "successfulInterruptions" variable represents a value for the number of successful interruptions at the endpoint. The "externalInterruptionAttempts" variable represents a value for the number of times that participants at other endpoints have attempted to interrupt the participant(s) at the endpoint. The "successfulFloorHolds" variable represents a value for the number of times that a participant at the endpoint has held the floor against an external interruption attempt. The "participantTalkSpurts" variable is a value for the number of non-interjection talk spurts (by a participant) at the endpoint. The "defaultTargetPowerLevel" variable represents a value for the default target level for the audio data stream at the endpoint based on the provisioned importance of participants at the endpoint. The "targetPowerLevel" represents a value for the target power level at which the audio data stream at the endpoint should be after a gain control module 40 applies the gain control to the audio stream. The "powerChangeHistory" object represents a historical record of recent power changes to the audio data streams at the endpoint. This object is a first-in-first-out (FIFO) list with a maximum size. Power changes are added to the FIFO until it reaches its maximum size. Subsequent to reaching maximum size, the oldest power change is discarded as the new one is added.

The processor 24 uses some of these variables to determine whether to transition between states for an FSM for a given endpoint. For example, in FIG. 4, if an FSM for a given endpoint is in the Possible Response state 220, an "interject timeout" event and an "activeTalkers" value of zero would cause a transition to the Talking state 240. Other variables are read and modified to generate the statistics associated with each endpoint.

The processor 24 uses certain global variables obtained from the FSMs at all of the endpoints to determine the correct target power level for a given endpoint. Examples of such global variables are "numberOfParticipants," "averageResponseSuccessRatio," "averageInterruptSuccessRatio,"

"averageFloorHoldSuccessRatio," "conferenceTalkSpurts," and "powerRangeTable" These variables are defined as follows.

The "numberOfParticipants" variable is the total number of audio data streams of a conference session. The "averageResponseSuccessRatio" is the ratio of the total number of successful responses measured by the processor 24 for all of the FSMs to the total number of response attempts measured by the processor 24 for all of the FSMs. The "averageInterruptSuccessRatio" is the ratio of the total number of successful interruptions measured by the processor 24 for all of the FSMs to the total number of interruption attempts measured by the processor for all of the FSMs. The averageFloorHoldSuccessRatio" is the ratio of the total number of successful floor holds measured by the processor 24 for all of the FSMs to the total number of external interruption attempts measured by the processor 24 for all of the FSMs. The "conferenceTalkSpurts" is the total number of non-interjection talk spurts for the entire conference measured by the processor 24 for all of the FSMs. The "powerRangeTable" is an associative memory, keyed by the set of default target power levels for the endpoints. Each record contains a value corresponding to the absolute value of the largest current power change, the largest deviation from the default target power level, for any endpoint with that default power level. These values are used for scaling the endpoints' targetPowerLevel values, as described below.

As mentioned above, the gain control devices 40(1)-40(n) are configured to receive gain control instructions from the processor 24 when executing the gain control policy agent logic 28. The gain control policy agent logic 28 operates with several objectives. Specifically, the gain control policy agent logic 28 is configured to keep the power levels for all of the audio data streams within a target power range so that none of the audio data streams may increase or decrease without bound. The power gains applied to the respective audio streams may be normalized to an audio stream from one of the plurality of endpoints. The power gains applied to the respective audio streams are adjusted so that audio streams for participants with high relative importance are louder than audio streams having participants with low relative importance. Also, the power gains applied to the respective audio streams are increased for participants of an audio stream who successfully respond to a previous speaker less often than the average participant and who successfully interrupt a current talker less often than the average participant. Likewise, to eliminate a "droner" participant effect, the power gains of the audio streams are decreased for participants of an audio stream who hold the floor better than the average participant. In all cases, the changes to the power level of the audio data streams are smooth and stable enough such that variations in the power levels do not distract the participants of the conference session. The flowcharts of FIGS. 8-14 described hereinafter define the various state transitions that are shown in FIG. 4.

Turning to FIG. 5, the gain control policy agent logic 28 for gathering audio data and initiation actions in the MCU device is shown. Generally, the operations of the logic 28 are to receive at the MCU a signal representing audio from each of a plurality of endpoints that are participating in a conference session. The conference session may be a video conference session or an audio conference session. The MCU selectively adjusts a power level of the audio from one or more of the endpoints based on information derived in real-time from the audio of the plurality of endpoints during the conference session and predetermined information pertaining to a source of the audio from at least one of the endpoints. The predetermined information pertaining to the source of the audio is the aforementioned provisioning information that represents the relative importance of the sources of audio at the plurality of endpoints during the conference session.

At 300, the processor 24 in the MCU 20 receives provisioning information indicating the relative importance of each participant at the endpoints. The processor 24 sets the default target power level (defaultTargetPowerLevel) for the audio data stream from a conference endpoint based on the relative importance of each participant contained in the provisioning information. The default target power levels are described above in connection with FIG. 3.

As depicted at 310, a processing loop is defined for operations 320-362 to be performed by the processor 24 of the MCU 20 while the conference is in session. When the conference is terminated, the process ends as shown at 315. Otherwise, starting at 320, the processor 24 computes statistics for voice or talk spurts for each of the audio data streams. As explained above, a given audio stream may contain audio from more than one participant, but such a stream is treated as audio from a single participant and, in most cases, the higher importance participant is used for determining the gain applied to that audio stream.

At 320, the processor 24 computes, over the plurality of endpoints in the conference session, conference-wide averages for the response success ratio, the interruption success ratio, the floor hold success ratio, and the talk spurt ratio for all audio data streams for the participants of the endpoints. That is, the processor 24 computes an average for the response success ratio over the plurality of endpoints, an average for the interruption success ratio over the plurality of endpoints, an average for the floor hold success ratio over the plurality of endpoints, and an average talk spurt ratio over the plurality of endpoints. These statistics are explained above.

As indicated at 330, another processing loop is defined for operation 360 made for each endpoint. At 360, the processor 24 uses one or more of the conference-wide statistics for talk spurts computed at 320, the endpoint-specific statistics for talk spurts for that audio stream, and provisioning information as to the relative importance of that participant for that audio stream to set the unsealed change in the target power (powerChange) for that participant. An example method for computing the change in the target power will be described below.

After the operation at 360 is performed for each participant, the process continues to operation 362. At 362, the processor 24 waits for some event indicating a change in the state of the conference or one of the audio streams and processes that event. This processing will be described in detail below.

Figure 6A:
FIG. 6a is an example of a flow chart depicting a process for updating the unscaled change in target power for each endpoint.

Reference is now made to FIG. 6a, noting that the variables referred to in FIG. 6a have been defined and explained above. FIG. 6a shows an example of a flow chart for operation 360 of FIG. 5 where the audio statistics are used to set the powerChange value for each audio stream. Generally, operation 360 involves, for the audio stream from each endpoint, comparing at least one of the response success ratio, interruption success ratio, floor hold success ratio, and talk spurt ratio with its corresponding conference average, and computing an unsealed power change based on those comparisons. One simplified version of the operations shown in FIG. 6 is to track the number of relatively long (greater than the interjection time threshold) talk spurts for each endpoint and to adjust the power level for audio from an endpoint that has a relatively greater number of talk spurts among the plurality of endpoints.

The operations of FIG. 6a are now described. For a particular audio stream, at 400, an unsealed target power change value ("powerChange") is computed by multiplying a scaling factor (represented by "TALKSPURT_SCALE") by the difference between the number of talk spurts for this endpoint ("participantTalkSpurts") and the average number of talk spurts for all conference endpoints. Note that endpoints with more talk spurts than average will have a positive target power change, while those with fewer talk spurts than average will have a negative target power change. The powerChange value of 400 is further increased or decreased at 410 by adding to it a value computed by multiplying a scaling factor ("RESPONSE_SCALE") by the difference between the endpoint's response success ratio and the average response success ratio. The powerChange value of 410 is further increased or decreased at 420 by adding to it a value computed by multiplying a scaling factor ("INTERRUPTION_SCALE") by the difference between the endpoint's interruption success ratio and the averageInterruptionSuccessRatio value. The powerChange value of 420 is still further increased or decreased at 430 by adding to it a value computed by multiplying a scaling factor ("FLOOR_HOLD_SCALE") by the difference between averageFloorHoldSuccessRatio and the endpoint's successful floor hold ratio. Once the powerChange value of 430 is determined, powerChange is added into the powerChangeHistory FIFO at 440, discarding the oldest entry if the FIFO is full. At 450, the powerChange value is smoothed over time by computing the average of all values in the powerChangeHistory FIFO.

Once the powerChange value has been computed, a value ("currentPowerRange") is calculated representing the largest deviation from the defaultTargetPowerLevel assigned to the set of endpoints sharing that defaultTargetPowerLevel. This value will be used subsequently to scale the overall powerChange for each endpoint so that it fits into the power range previously described in connection with FIG. 3. To compute this value, the endpoint's defaultPowerRange is used as a key to read, at 460, a value from the powerRangeTable associative memory. The largest deviation is then computed at 470 ("newCurrentPowerRange") by computing the maximum of the read value or the absolute value of powerChange. At 480, this maximum is then written back into the powerRangeTable.

Figure 6B:
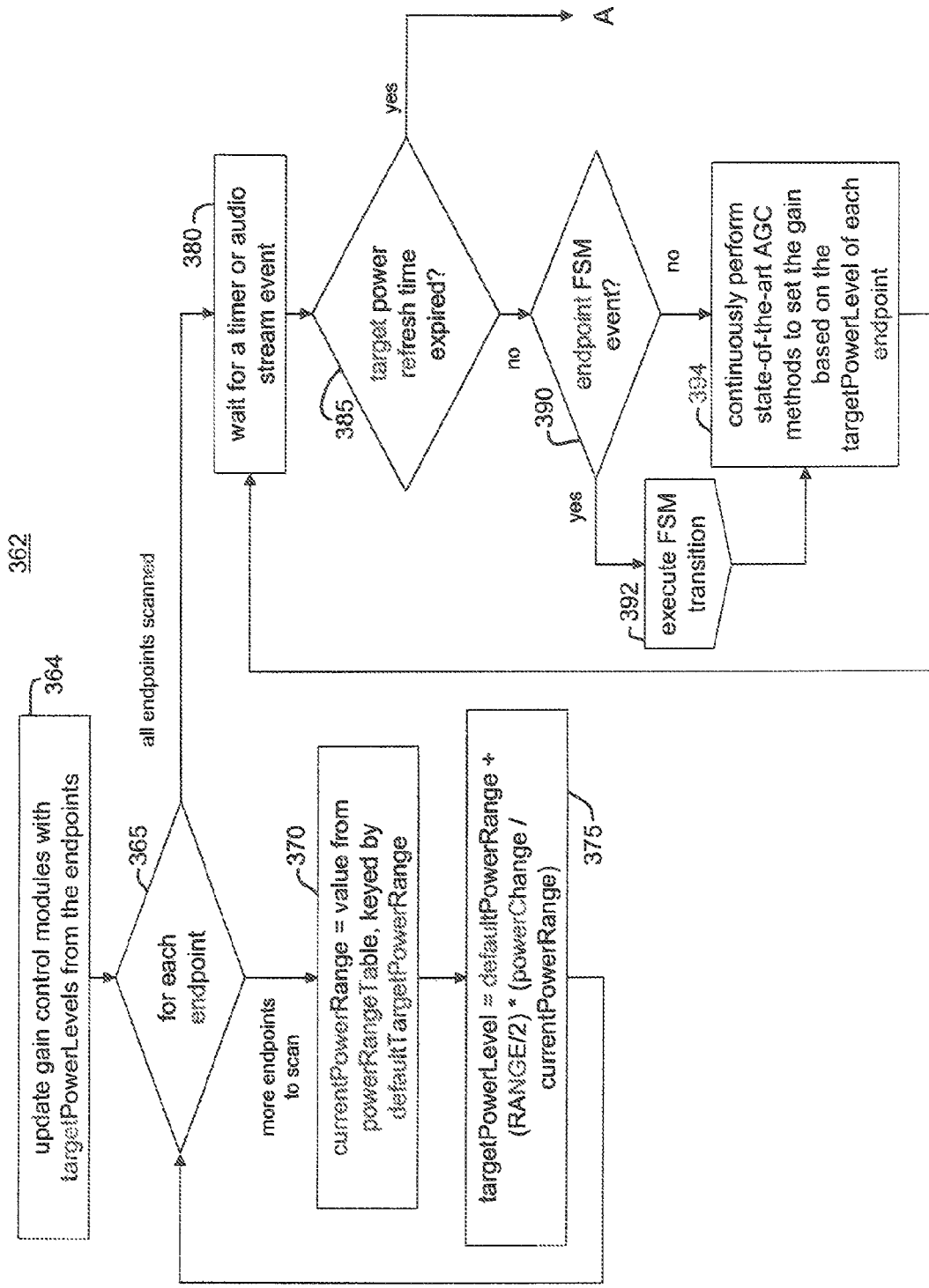
FIG. 6b is an example of a flow chart depicting a process for determining new target power levels for each endpoint.

Reference is now made to FIG. 6b. FIG. 6b shows an example of a flow chart for the operation 362 in FIG. 5. At 364, all endpoints' current targetPowerLevels are used to update the gain control modules 40(1)-40(n). At 365, a loop comprising steps 370 and 375 is executed for each endpoint. At 370, a powerRangeTable associative memory value is read, using the current endpoint's defaultTargetPowerRange as a key. The value read ("currentPowerRange") represents the maximum power deviation for any endpoint with the current defaultPowerRange. A target power level, scaled to fit within the power range, is then generated for the endpoint at 375, by multiplying half the power range width by the ratio of the endpoint's power change to the value read from the associative memory, then adding the result to defaultTargetPowerRange. This value is then stored in the endpoint's "targetPowerLevel" parameter. By so scaling the power change, the targetPowerLevel is guaranteed to fit within the power band associated with the default target power level, whether the power change is positive or negative. Following this computation, control returns to 365, where the loop is repeated until all endpoints have been scanned.

Control then passes to 380, where the process waits for a timer or audio stream event to occur before continuing the execution of operation 362. In 385, the event is checked to see if it indicates the expiration of a "power refresh timer." If the power refresh timer has expired, the control returns back to step 310 in FIG. 5 to determine whether the conference is still in session, where the entire process is repeated until the conference terminates. If the power refresh timer has not expired, the control passes to 390 where the event is checked to see if it is one that is processed by the endpoints' statistics-generating FSM. These events were previously defined in the description of FIG. 4. If the event is one of the events processed by the endpoints' statistics-generating FSM, an FSM transition is executed in 392.

Other events are related to the conference or its audio streams. In all cases, any event, or any change in the power level of an audio stream, results in the continuous operation of existing automatic gain control methods, as shown in step 394. That is, the methods described herein cause only the target power levels for each audio stream to be adjusted. State-of-the-art automatic gain control methods then continuously adjust the actual gain of each audio stream to come as close to those target power levels as possible. Automatic gain control methods may either be implemented by the processor 24, or by the gain control modules 40(1)-40(n).

Reference is now made to FIG. 7. FIG. 7 shows an example of a flow chart for operation 392 in FIG. 6b, for executing transitions for the FSMs for each of the endpoints in response to calculated audio statistics. At 520, the processor 24 selects the endpoint to which the event applies and switches the state of the endpoint's associated FSM at 530 based on the current state of the selected FSM. Operations 550, 600, 650, 700, 750, 800, and 850 indicate the possible transition operations that are performed depending on the current state of the FSM. These state transitions are also depicted in FIG. 4.

Reference is now made to FIG. 8. FIG. 8 shows the operations 550 that are performed for a state transition for an FSM that is currently in the Quiet state. At 555, the state transition is determined based on the type of event received. Table 1, below, summarizes the possible state transitions of the FSM from the Quiet state.

TABLE 1

Quiet state transitions.

| Event | Action | Next State |
|---|---|---|
| start spurt | start interjection timer | if (activeTalkers == 0) "Possible Response" else "Possible Interruption" |
| stop spurt | n/a | "quiet" |
| interject timeout | n/a | "quiet" |
| talker active | activeTalkers++ | "quiet" |
| talker inactive | activeTalkers-- | "quiet" |

As shown in Table 1, the Quiet state can transition only to either the Possible Response state or the Possible Interruption state. At 560 in FIG. 8, when a start spurt event occurs, an interjection timer is started at 562. At 564, it is determined whether the current count of active talkers at other endpoints is equal to zero (i.e., whether the value of "activeTalkers" is zero). If the value of activeTalkers is zero, the FSM transitions from the Quiet state to the Possible Response state, as shown in Table 1 and shown at 566. If the value of activeTalkers is not zero, the FSM transitions from the Quiet state to the Possible Interruption state, as shown in Table 1 and at 568. If a talker active event occurs at 570, the FSM remains in the Quiet state and the value for activeTalkers is incremented at 572. Similarly, if a talker inactive event occurs at 580, the FSM also remains in the Quiet state and the value for activeTalkers is decremented at 582.

Reference is now made to FIG. 9. FIG. 9 shows the operations 600 that are performed for a state transition for an FSM that is in currently in the Possible Response state. At 605, the state transition is determined based on the type of event received. Table 2, below, summarizes the possible state transitions of the FSM from the Possible Response state.

TABLE 2

Possible Response state transitions.

| Event | Action | Next State |
| --- | --- | --- |
| start spurt | n/a | "Possible Response" |
| stop spurt | cancel interjection timer (talk spurt was only an interjection) | "Quiet" |
| interject timeout | responseAttempt++ participantTalkSpurts++ conferenceTalkSpurts++ publish "talker active" event to all other FSMs if (activeTalkers == 0) successfulResponses++ | if (activeTalkers == 0) "Talking" else "Attempting Response" |
| talker active | activeTalkers++ | "Possible Response" |
| talker inactive | activeTalkers-- | "Possible Response" |

As shown in Table 2, the Possible Response state can transition only to the Quiet state, Talking state, or Attempting Response state. At 610 in FIG. 9, when a stop spurt event occurs, it is assumed that the talk spurt was so short that it was an interjection. An interjection timer is canceled at 612, and the state of the FSM transitions from the Possible Response state to the Quiet state at 614. At reference 620, when an interject timeout event occurs, the talk spurt is considered long enough to be some kind of attempt to talk into the conference. The values for the responseAttempts, participantTalkSpurts, and conferenceTalkSpurts variables are incremented at 622, as also shown in Table 2. These variables are explained above. At 624, the "talker active" event is sent to (i.e., shared with) all of the FSMs for all the other endpoints. At 626, it is determined whether the value of activeTalkers is zero. If the value of activeTalkers is zero, the value of successfulResponses is incremented at 628, and the state of the FSM transitions from the Possible Response state to the Talking state at 630. If the value of activeTalkers is not zero, the state of the FSM transitions from the Possible Response state to the Attempting Response state at 632. When a talker active event 634 occurs, the FSM remains in the Possible Response state and the value for activeTalkers is incremented at 636. Similarly, when a talker inactive event 638 occurs, the FSM also remains in the Possible Response state, and the value for activeTalkers is decremented at 640.

Figure 10:
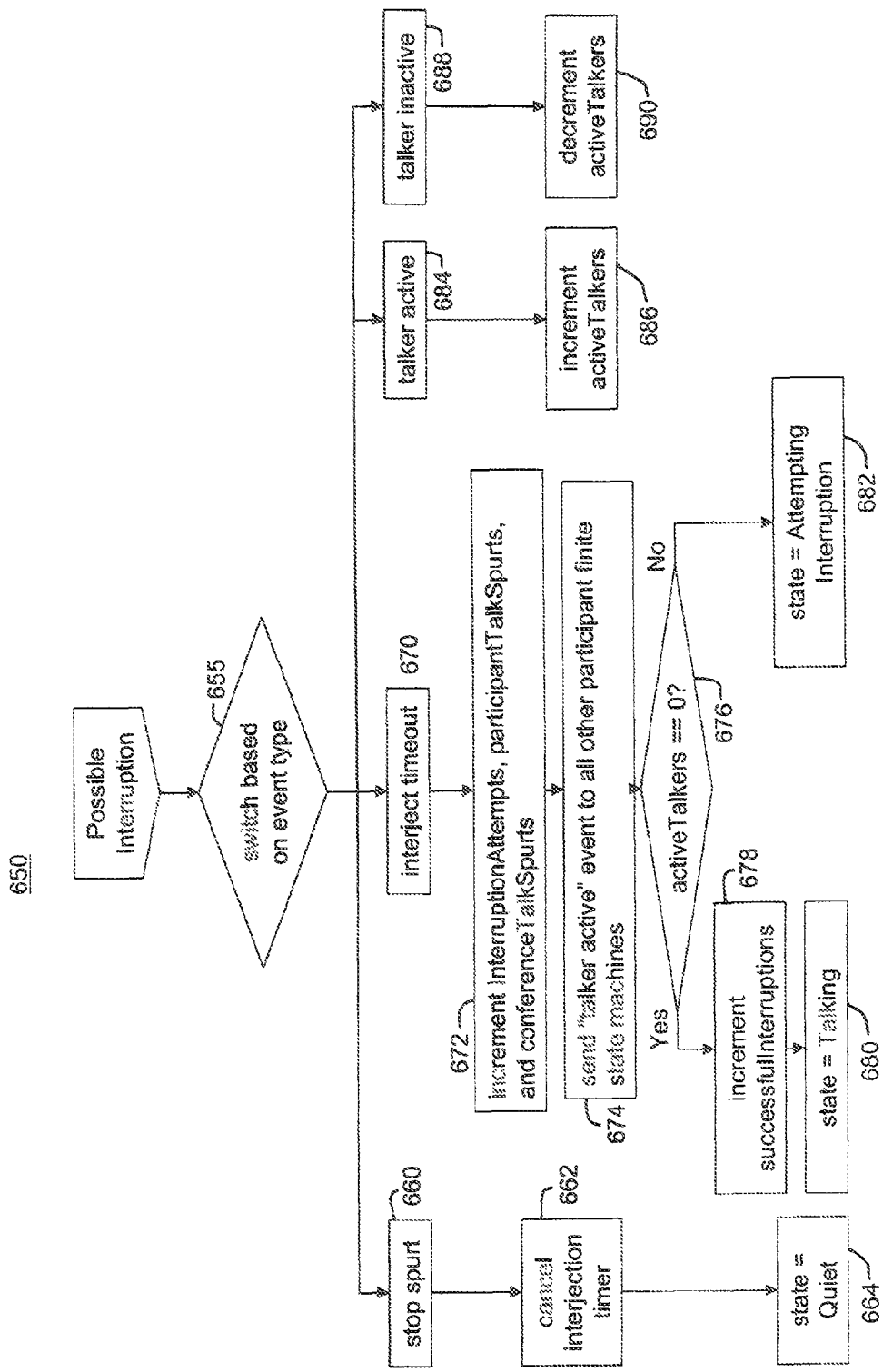
FIG. 10 is an example of a flow chart depicting a process for determining transitions from a Possible Interruption state of the FSM.

Reference is now made to FIG. 10. FIG. 10 shows the operations 650 that are performed for a state transition for a FSM that is currently in the Possible Interruption state. At 655, the state transition is determined based on the type of event received. Table 3, below, summarizes the potential state transitions of the FSM from the Possible Interruption state.

TABLE 3

Possible Interruption state transitions.

| Event | Action | Next State |
| --- | --- | --- |
| start spurt | n/a | "Possible Interruption" |
| stop spurt | cancel interjection timer (this was an interjection) | "Quiet" |
| interject timeout | interruptionAttempts++ participantTalkSpurts++ conferenceTalkSpurts++ publish "talker active" event to all other FSMs if (activeTalkers == 0) successfulInterruptions++ | if (activeTalkers == 0) "Talking" else "Attempting Interruption" |
| talker active | activeTalkers++ | "Possible Interruption" |
| talker inactive | activeTalkers-- | "Possible Interruption" |

As shown in Table 3, the Possible Interruption state of the selected FSM can transition only to the Quiet state, Talking state, or Attempting Interruption state. At 660 in FIG. 10, when a stop spurt event occurs, an interjection timer is canceled at 662, and the state of the FSM transitions from the Possible Interruption state to the Quiet state at 664. At 670, when an interject timeout event occurs, the values for the InterruptionAttempts, participantTalkSpurts, and conferenceTalkSpurts variables are incremented at 672, as also shown in Table 3. These variables are explained above. At 674, the "talker active" event is sent to (i.e., shared with) all of the FSMs for all the other endpoints. At 676, it is determined whether the value of activeTalkers is zero. If the value of activeTalkers is zero, the value of successfulInterruptions is incremented at 678, and the state of the FSM transitions from the Possible Interruption state to the Talking state at 680. If the value of activeTalkers is not zero, the state of the FSM transitions from the Possible Interruption state to the Attempting Interruption state. When a talker active event occurs at 684, the FSM remains in the Possible Interruption state and the value for activeTalkers is incremented at 686. Similarly, when a talker inactive event occurs at 688, the FSM also remains in the Possible Interrupted state, and the value for activeTalkers is decremented at 690.

Figure 11:
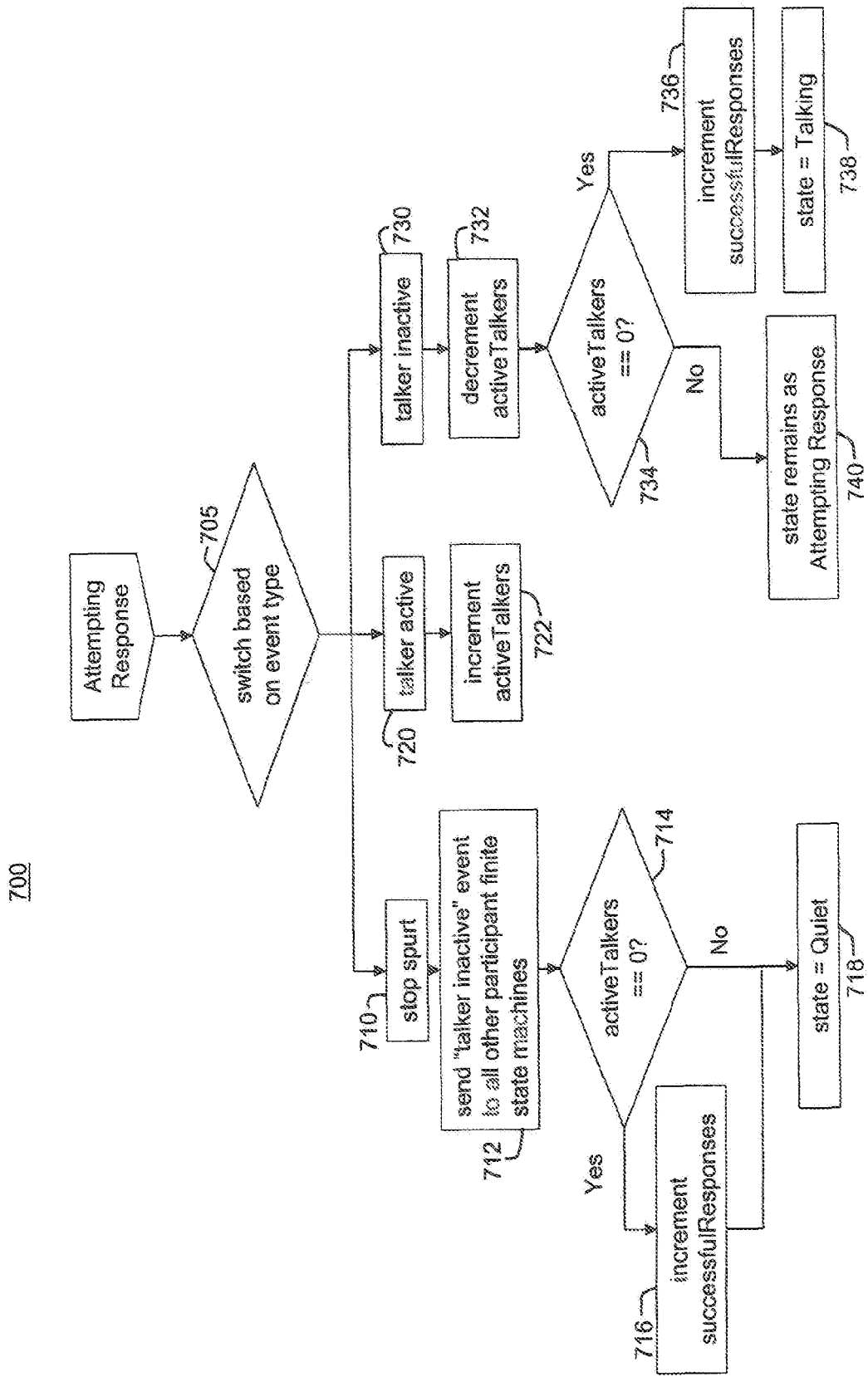
FIG. 11 is an example of a flow chart depicting a process for determining transitions from an Attempting Response state of the FSM.

Reference is now made to FIG. 11. FIG. 11 shows the operations 700 that are performed for a state transition for a FSM that is currently in the Attempting Response state. At 705, the state transition is determined based on the type of event received. Table 4, below, summarizes the potential state transitions of the FSM from the Attempting Response state.

TABLE 4

Attempting Response state transitions.

| Event | Action | Next State |
| --- | --- | --- |
| start spurt | n/a | "Attempting Response" |
| stop spurt | publish "talker inactive" event to all other FSMs if (activeTalkers == 0) successfulResponses++ | "Quiet" |
| interject timeout | n/a | "Attempting Response" |
| talker active | activeTalkers++ | "Attempting Response" |
| talker inactive | activeTalkers-- if (activeTalkers == 0) successfulResponses++ | if (activeTalkers == 0) "Talking" else "Attempting Response" |

As shown in Table 4, the Attempting Response state of the selected FSM can transition only to the Quiet state or the Talking state. At 710 in FIG. 11, if a stop spurt event occurs, then at 712, a "talker inactive" event is sent to (i.e., shared with) all of the FSMs for all the other endpoints. At 714, it is determined whether the value of activeTalkers is zero. If the value of activeTalkers is zero, the value of successfulResponses is incremented at 716, and the state of the FSM transitions from the Attempting Response state to the Quiet state at 718. Also, if the value of activeTalkers is not zero, then the response attempt is deemed to have failed, since the talker on this endpoint gave up before other responders did. The value of successfulResponses is therefore not incremented. The state of the FSM transitions from the Attempting Response state to the Quiet state at 718. If a talker active event occurs at 720, the value of the activeTalkers variable is incremented at 722, and the state of the FSM remains in the Attempting Response state. If a talker inactive event occurs at 730, the value of the activeTalkers variable is decremented at 732, and the decision operation 734 is performed. At 734, when the value of activeTalkers is zero, this indicates that all other participants that attempted to respond gave up before this participant did, so the value of successfulResponses is incremented at 736, and the state of the FSM transitions from the Attempting Response state to the Talking state at 738. If the value of activeTalkers is not zero, the state of the FSM remains in the Attempting Response state at 740.

Figure 12:
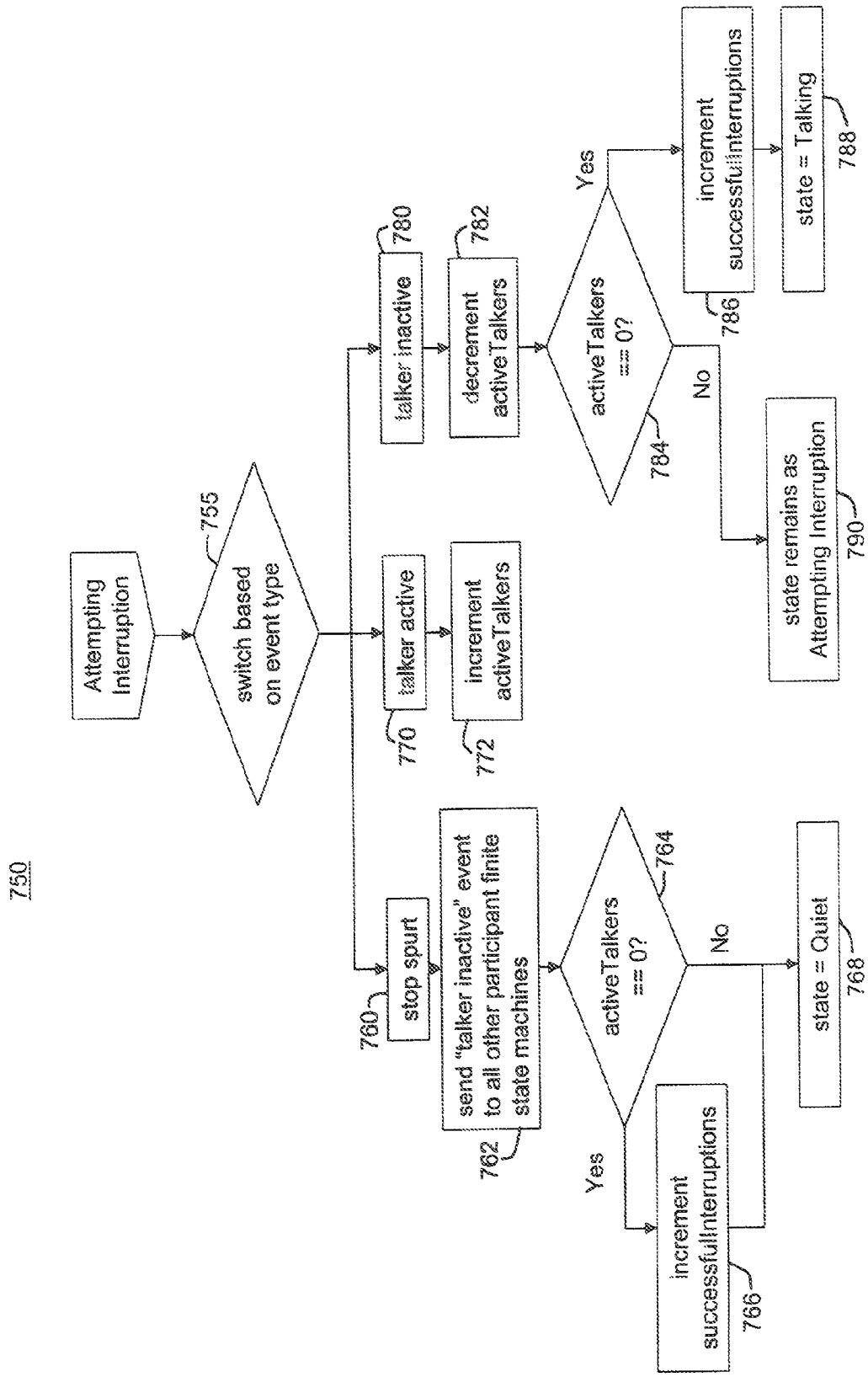
FIG. 12 is another example of a flow chart depicting a process for determining transitions from an Attempting Interruption state of the FSM.

Reference is now made to FIG. 12. FIG. 12 shows the operations 750 that are performed for a state transition for an FSM that is currently in the Attempting Interruption state. At 755, the state transition is determined based on the type of event received. Table 5, below, summarizes the potential state transitions of the FSM from the Attempting Interruption state.

TABLE 5

Attempting Interruption state transitions.

| Event | Action | Next State |
|---|---|---|
| start spurt | n/a | "Attempting Interruption" |
| stop spurt | publish "talker inactive" event to all other FSMs if (activeTalkers == 0) sucessfulInterruptions++ | "Quiet" |
| Interject timeout | n/a | "Attempting Interruption" |
| talker active | activeTalkers++ | "Attempting Interruption" |
| talker inactive | activeTalkers-- if (activeTalkers == 0) sucessfulInterruptions++ | if (activeTalkers == 0) "Talking" else "Attempting Interruption" |

As shown in Table 5, the Attempting Interruption state of the selected FSM can transition only to the Quiet state or Talking state. At 760 in FIG. 12, if a stop spurt event occurs, then a "talker inactive" event is sent to (i.e., shared with) all of the FSMs for all the other endpoints. At 764, it is determined whether the value of activeTalkers is zero. If the value of activeTalkers is zero, the value of successfulInterruptions is incremented at 766, and the state of the FSM transitions from the Attempting Interruption state to the Quiet state at 768. Also, if the value of activeTalkers is not zero, then it is assumed that this participant gave up on his attempt to interrupt another participant, so successfulInterruptions is not incremented. The state of the FSM transitions from the Attempting Interruption state to the Quiet state at 768. If a talker active event occurs at 770, the value of the activeTalkers variable is incremented at 772, and the state of the FSM remains in the Attempting Interruption state. If a talker inactive event occurs at 780, the value of the activeTalkers variable is decremented at 782, and the decision operation 784 is performed. At 784, if the value of activeTalkers is zero, the value of successfulInterruptions is incremented at 786, and the state of the FSM transitions from the Attempting Interruption state to the Talking state at 788. If the value of activeTalkers is not zero, the state of the FSM remains in the Attempting Interruption state at 790.

Figure 13:
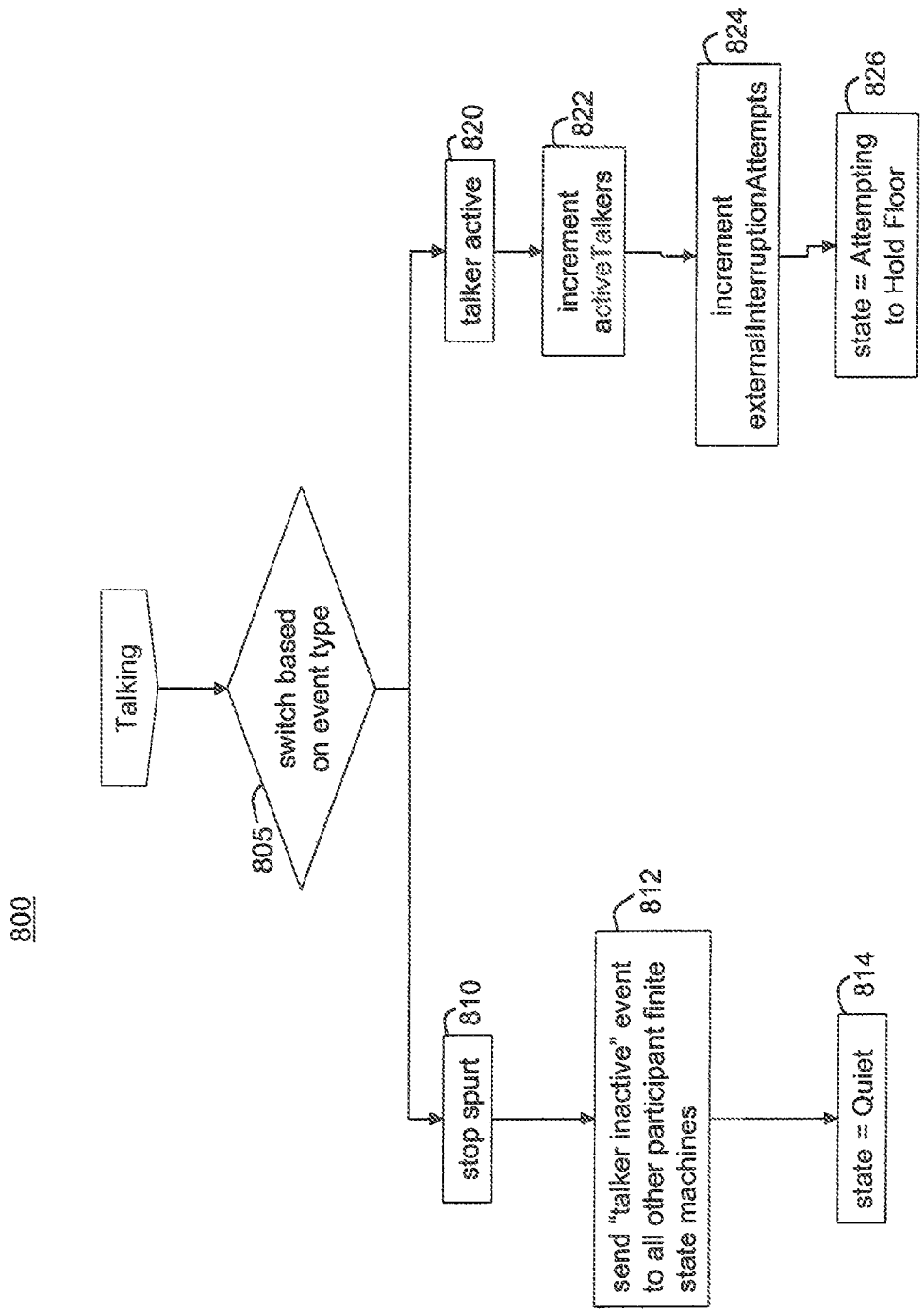
FIG. 13 is an example of a flow chart depicting a process for determining transitions from a Talking state of the FSM.

Reference is now made to FIG. 13. FIG. 13 shows the operations 800 that are performed for a state transition for an FSM that is currently in the Talking state. At 805, the state transition is determined based on the type of event received. Table 6, below, summarizes the potential state transitions of the FSM from the Talking state.

TABLE 6

Talking state transitions.

| Event | Action | Next State |
|---|---|---|
| start spurt | n/a | "Talking" |
| stop spurt | publish "talker inactive" event to all other FSMs | "Quiet" |
| interject timeout | n/a | "Talking" |
| talker active | activeTalkers++ externalInterruptAttempts++ | "Attempting to Hold Floor" |
| talker inactive | n/a (can only enter this state when there are no active talkers, so we shouldn't ever see this) | "Talking" |

As shown in Table 6, the Talking state of the FSM can transition only to the Quiet state or the Attempt-to-Hold-Floor state. At 810 in FIG. 13, if a stop spurt event occurs, a "talker inactive" event is sent to (i.e., shared with) all of the FSMs for all the other endpoints. Then, at 814, the state of the FSM transitions from the Talking state to the Quiet state. At 820, if a talker inactive event occurs, then at 822 the activeTalkers value is incremented and, at 824, because another participant is now attempting to interrupt a participant who is already talking on this endpoint, the externalInterruptionAttempts value is incremented. Then, at 826, the state of the FSM transitions from the Talking state to the Attempting-to-Hold-Floor state.

Figure 14:
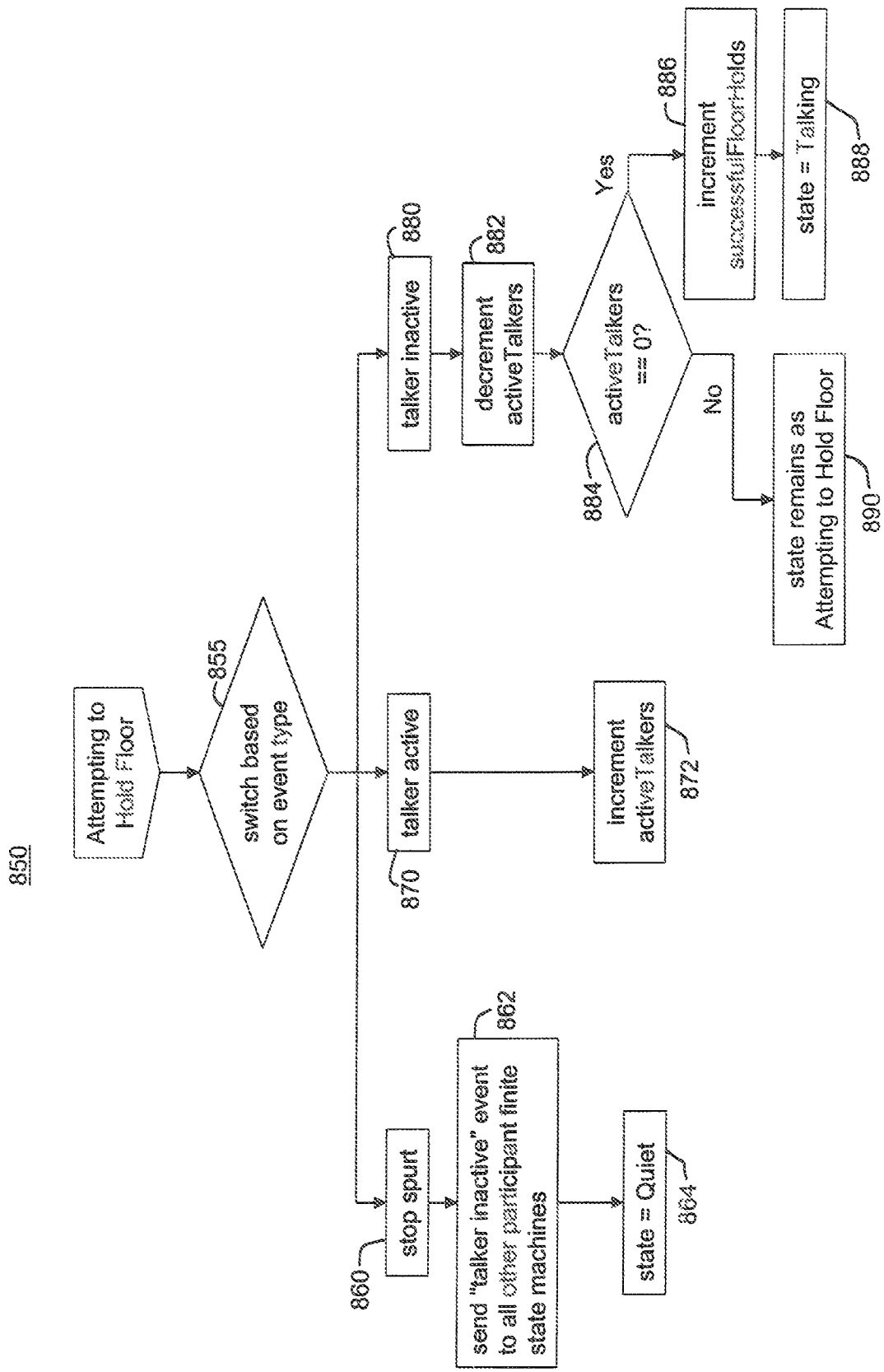
FIG. 14 is an example of a flow chart depicting a process for determining transitions from an Attempting-to-Hold-Floor state of the FSM.

Reference is now made to FIG. 14. FIG. 14 shows the operations 850 that are performed for a state transition for a FSM that is currently in the Attempting-to-Hold-Floor state. At 855, the state transition is determined based on the type of event received. Table 7, below, summarizes the potential state transitions of the FSM from the Attempting-to-Hold-Floor state.

TABLE 7

Attempting-to-Hold-Floor state transitions.

| Event | Action | Next State |
|---|---|---|
| start spurt | n/a | "attempting to hold floor" |
| stop spurt | publish "talker inactive" event to all other FSMs (floor hold attempt failed) | "quiet" |
| interject timeout | n/a | "attempting to hold floor" |
| talker active | activeTalkers++ | "attempting to hold floor" |
| talker inactive | activeTalkers-- if (activeTalkers == 0) heldFloor++ | if (activeTalkers == 0) "talking" else "attempting to hold floor" |

As shown in Table 7, the Attempting Response state of an FSM can transition only to the Quiet state or the Talking state. At 860 in FIG. 14, if a stop spurt event occurs, then at 862 a "talker inactive" event is sent to all of the FSMs for all the other endpoints. Since the participant who was talking on this endpoint gave up before the participants who were attempting to interrupt him/her, the "heldFloor" statistic is not incremented. At 864, the state of the FSM transitions from the Attempting-to-Hold-Floor state to the Quiet state. If a talker active event occurs at 870, the value of the activeTalkers variable is incremented at 872, and the state of the FSM remains in the Attempting-to-Hold-Floor state. If a talker inactive event 880 occurs, the value of the activeTalkers variable is decremented at 882, and the decision operation 884 is performed. At 884, if the value of activeTalkers is zero, the value of heldFloor is incremented at 886, and the state of the FSM transitions from the Attempting-to-Hold-Floor state to the Talking state at 888. If the value of activeTalkers is not zero, the state of the FSM remains in the Attempting-to-Hold-Floor state at 890.

In sum, an apparatus is provided comprising a network interface device configured to receive a plurality of audio inputs from corresponding ones of a plurality of endpoints participating in a conference session, and a processor configured to be coupled to the network interface. The processor is configured to receive the plurality of audio inputs from the network interface device and to adjust a target power level of the audio from one or more of the endpoints based on information derived in real-time from the audio of the plurality of endpoints during the conference session and predetermined information pertaining to a source of the audio from at least one of the endpoints.

Similarly, a tangible computer-readable memory medium is provided that stores or is encoded with instructs that, when executed by a processor, cause the processor to: receive a signal representing audio from each of a plurality of endpoints participating in a conference session; and adjust a target power level of the audio from one or more of the endpoints based on information derived in real-time from the audio of the plurality of endpoints during the conference session and predetermined information pertaining to a source of the audio from at least one of the endpoints.

The above description is intended by way of example only. Various modifications and structural changes may be made therein without departing from the scope of the concepts described herein and within the scope and range of equivalents of the claims.

What is claimed is:

1. A method comprising:
communicating, at a control unit, with a plurality of endpoints participating in a conference session, receiving a signal representing audio from each of the plurality of endpoints;
generating audio statistics information derived from the audio of the plurality of endpoints during the conference session, wherein the audio statistics information comprise statistics for talk spurts detected over time for each of the plurality of endpoints;
generating based on the audio statistics information a set of ratios comprising:
a response success ratio based on a number of successful response attempts in which a participant from a first endpoint, having attempted to respond to the speech of a participant at a second endpoint, remains speaking after all participants from a plurality of other endpoints have stopped speaking, relative to a total number of response attempts;
an interruption-success ratio based on a number of successful interruption attempts in which a participant from a first endpoint, having attempted to interrupt one or more participants from a plurality of second endpoints, remains speaking after all participants on other endpoints have stopped speaking, relative to a total number of interruption attempts;
a floor hold success ratio based on a number of successful floor hold attempts in which a participant from a first endpoint, having been interrupted by one or more participants from a plurality of other endpoints, remains speaking after all participants on other endpoints have stopped speaking, relative to a total number of interruption attempts from other endpoints; and
a talk spurt ratio based on a number of non-interjection talk spurts of the endpoint relative to a total number of talk spurts for the plurality of endpoints; and
adjusting a target power level of the audio from one or more of the endpoints based on a comparison of statistics for talk spurts associated with each of the plurality endpoints.

2. The method of claim 1, wherein adjusting further comprises communicating a target power level to each of one or more of a plurality of gain control modules that are executing an automatic gain control process for the audio from a corresponding endpoint.

3. The method of claim 1, wherein adjusting comprises adjusting the target power level of the audio from at least one endpoint based on predetermined information that represents a relative importance of the sources of audio at the plurality of endpoints during the conference session.

4. The method of claim 1, at the control unit, further comprising monitoring the signals from the plurality of endpoints to discern between time intervals of voice audio that are relatively short interjections from time intervals of voice audio that are relatively long talk spurts.

5. The method of claim 1, at the control unit, further comprising generating data tracking detections of one or more of:
an attempt by a participant at one endpoint to speak when all participants on other endpoints are silent;
an attempt by a participant at one endpoint to respond to a participant at another endpoint;
an attempt by a participant at one endpoint to interrupt a participant at another endpoint;
a participant successfully speaking when all participants on other endpoints are silent;
a participant successfully responding to a participant on another endpoint;
a participant successfully interrupting a participant on another endpoint; and
a participant successfully holding the floor after a participant at another endpoint attempts to interrupt.

6. The method of claim 5, wherein tracking detections of an attempt by a participant at one endpoint to speak when all participants on other endpoints are silent further comprises detecting the beginning of a non-interjection talk spurt from one audio stream while no talk spurts on other audio streams are ongoing.

7. The method of claim 5, wherein tracking detection of an attempt by a participant at one endpoint to respond to a participant at another endpoint further comprises one or more of:
detecting the beginning of a non-interjection talk spurt from one audio stream shortly before talk spurts from another audio stream ends; and
detecting the beginning of a non-interjection talk spurt from one audio stream while no other audio streams are ongoing.

8. The method of claim 5, wherein tracking detection of an attempt by a participant at one endpoint to interrupt a participant at another endpoint further comprises detecting the beginning of a non-interjection talk spurt from one audio stream while other non-interjection talk spurts are ongoing.

9. The method of claim 5, wherein tracking detection of one or more of: a participant successfully speaking when all participants on other endpoints are silent; a participant successfully responding to a participant on another endpoint; and a participant successfully interrupting a participant on another endpoint; further comprises detecting the end of a non-interjection talk spurt from one audio stream when no other non-interjection talk spurts are ongoing.

10. The method of claim 5, wherein tracking detection of a participant successfully holding the floor after a participant another endpoint attempts to interrupt further comprises:
    detecting the beginning of a non-interjection talk spurt on one or more endpoints during a first ongoing, non-interjection talk spurt; and
    detecting the end of all other non-interjection talk spurts.

11. The method of claim 5, and further comprising computing one or more of:
    an average for the response success ratio over the plurality of endpoints;
    an average for the interruption success ratio over the plurality of endpoints;
    an average for the floor hold success ratio over the plurality of endpoints; and
    an average talk spurt ratio over the plurality of endpoints.

12. The method of claim 11, and further comprising for each endpoint, comparing at least one of the response success ratio, interruption success ratio, floor hold success ratio, and talk spurt ratio with its corresponding average, and wherein adjusting comprises adjusting a target power level of the audio for an endpoint based on the comparison.

13. The method of claim 4, and further comprising tracking a number of talk spurts for each endpoint, and wherein adjusting comprises adjusting a target power level for audio from an endpoint that has a relatively greater number of talk spurts among the plurality of endpoints.

14. A computer-readable memory medium storing instructions that, when executed by a processor, cause the processor to:
    receive a signal representing audio from each of a plurality of endpoints participating in a conference session;
    generate audio statistics information derived from the audio of the plurality of endpoints during the conference session, wherein the audio statistics information comprise statistics for talk spurts detected over time for each of the plurality of endpoints;
    generate based on the audio statistics information a set of ratios comprising:
        a response success ratio based on a number of successful response attempts in which a participant from a first endpoint, having attempted to respond to the speech of a participant at a second endpoint, remains speaking after all participants from a plurality of other endpoints have stopped speaking, relative to a total number of response attempts;
        an interruption-success ratio based on a number of successful interruption attempts in which a participant from a first endpoint, having attempted to interrupt one or more participants from a plurality of second endpoints, remains speaking after all participants on other endpoints have stopped speaking, relative to a total number of interruption attempts;
        a floor hold success ratio based on a number of successful floor hold attempts in which a participant from a first endpoint, having been interrupted by one or more participants from a plurality of other endpoints, remains speaking after all participants on other endpoints have stopped speaking, relative to a total number of interruption attempts from other endpoints; and
        a talk spurt ratio based on a number of non-interjection talk spurts of the endpoint relative to a total number of talk spurts for the plurality of endpoints; and
    adjust a target power level of the audio from one or more of the endpoints based on a comparison of statistics for talk spurts associated with each of the plurality endpoints.

15. The computer-readable memory medium of claim 14, wherein the instructions that cause the processor to adjust the target power level of the audio comprise instructions that cause the processor to supply a target power level to each of one or more of a plurality of gain control modules that are executing an automatic gain control process for the audio from a corresponding endpoint.

16. The computer-readable memory medium of claim 14, wherein the instructions that cause the processor to generate comprise instructions that cause the processor to generate data tracking detections of one or more of:
    an attempt by a participant at one endpoint to speak when all participants on other endpoints are silent;
    an attempt by a participant at one endpoint to respond to a participant at another endpoint;
    an attempt by a participant at one endpoint to interrupt a participant at another endpoint;
    a participant successfully speaking when all participants on other endpoints are silent;
    a participant successfully responding to a participant on another endpoint;
    a participant successfully interrupting a participant on another endpoint; and
    a participant successfully holding the floor after a participant at another endpoint attempts to interrupt.

17. An apparatus comprising:
    a network interface device configured to receive a plurality of audio inputs from corresponding ones of a plurality of endpoints participating in a conference session; and
    a processor configured to be coupled to the network interface, wherein the processor is configured to:
        receive the plurality of audio inputs from the network interface device;
        generate audio statistics information derived from the audio of the plurality of endpoints during the conference session, wherein the audio statistics information comprise statistics for talk spurts detected over time for each of the plurality of endpoints;
        generate based on the audio statistics information a set of ratios comprising:
            a response success ratio based on a number of successful response attempts in which a participant from a first endpoint, having attempted to respond to the speech of a participant at a second endpoint, remains speaking after all participants from a plurality of other endpoints have stopped speaking, relative to a total number of response attempts;
            an interruption-success ratio based on a number of successful interruption attempts in which a participant from a first endpoint, having attempted to interrupt one or more participants from a plurality of second endpoints, remains speaking after all participants on other endpoints have stopped speaking, relative to a total number of interruption attempts;
            a floor hold success ratio based on a number of successful floor hold attempts in which a participant from a first endpoint, having been interrupted by one or more participants from a plurality of other endpoints, remains speaking after all participants on other endpoints have stopped speaking, relative to a total number of interruption attempts from other endpoints; and a talk spurt ratio based on a number of non-interjection talk spurts of the endpoint relative to a total number of talk spurts for the plurality of endpoints; and adjust a target power level of the audio from one or more of the endpoints based on a comparison of statistics for talk spurts associated with each of the plurality endpoints.

18. The apparatus of claim 17, wherein the processor is further configured to adjust the target power level of audio from at least one endpoint based on predetermined information that represents a relative importance of the sources of audio at the plurality of endpoints during the conference session.

19. The apparatus of claim 17, wherein the processor is further configured to supply a target power level to each of one or more of a plurality of gain control modules that are executing an automatic gain control process for the audio from a corresponding endpoint.

20. The apparatus of claim 17, wherein the processor is further configured to generate data tracking detections of one or more of:
   an attempt by a participant at one endpoint to speak when all participants on other endpoints are silent;
   an attempt by a participant at one endpoint to respond to a participant at another endpoint;
   an attempt by a participant at one endpoint to interrupt a participant at another endpoint;
   a participant successfully speaking when all participants on other endpoints are silent;
   a participant successfully responding to a participant on another endpoint;
   a participant successfully interrupting a participant on another endpoint; and
   a participant successfully holding the floor after a participant at another endpoint attempts to interrupt.

21. The computer-readable memory medium of claim 16, and further comprising instructions operable to compute one or more of:
   an average for the response success ratio over the plurality of endpoints;
   an average for the interruption success ratio over the plurality of endpoints;
   an average for the floor hold success ratio over the plurality of endpoints; and
   an average talk spurt ratio over the plurality of endpoints.

22. The computer-readable memory medium of claim 21, and further comprising instructions operable to compare for each endpoint at least one of the response success ratio, interruption success ratio, floor hold success ratio, and target power level of the audio for an endpoint based on the comparison.

23. The apparatus of claim 17, wherein the processor is further configured to generate data tracking detections of one or more of:
   an attempt by a participant at one endpoint to speak when all participants on other endpoints are silent;
   an attempt by a participant at one endpoint to respond to a participant at another endpoint;
   an attempt by a participant at one endpoint to interrupt a participant at another endpoint;
   a participant successfully speaking when all participants on other endpoints are silent;
   a participant successfully responding to a participant on another endpoint;
   a participant successfully interrupting a participant on another endpoint; and
   a participant successfully holding the floor after a participant at another endpoint attempts to interrupt.

24. The apparatus of claim 23, wherein the processor is further configured to compute one or more of:
   an average for the response success ratio over the plurality of endpoints;
   an average for the interruption success ratio over the plurality of endpoints;
   an average for the floor hold success ratio over the plurality of endpoints; and
   an average talk spurt ratio over the plurality of endpoints.

25. The apparatus of claim 24, wherein the processor is further configured to compare at least one of the response success ratio, interruption success ratio, floor hold success ratio, and talk spurt ratio with its corresponding average, and wherein adjusting comprises adjusting a target power level of the audio for an endpoint based on the comparison.

\* \* \* \* \*